(12) United States Patent
Murata

(10) Patent No.: US 12,524,520 B2
(45) Date of Patent: Jan. 13, 2026

(54) INFORMATION PROCESSING APPARATUS, INFORMATION PROCESSING METHOD, AND INFORMATION PROCESSING SYSTEM

(71) Applicant: CANON KABUSHIKI KAISHA, Tokyo (JP)

(72) Inventor: Takahiro Murata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 18/663,554

(22) Filed: May 14, 2024

(65) Prior Publication Data

US 2024/0403408 A1 Dec. 5, 2024

(30) Foreign Application Priority Data

May 30, 2023 (JP) ................................. 2023-088408

(51) Int. Cl.
*G06F 21/46* (2013.01)
(52) U.S. Cl.
CPC .................................... *G06F 21/46* (2013.01)
(58) Field of Classification Search
None
See application file for complete search history.

(56) References Cited

U.S. PATENT DOCUMENTS

2019/0253456 A1* 8/2019 Wang ................. H04N 1/00307
2023/0401022 A1* 12/2023 Maeda ................... G06F 3/1222

FOREIGN PATENT DOCUMENTS

JP 2022031302 A 2/2022

* cited by examiner

*Primary Examiner* — Trang T Doan
(74) *Attorney, Agent, or Firm* — Canon U.S.A., Inc., IP Division

(57) ABSTRACT

An information processing apparatus includes a first acquisition unit configured to acquire, from an external apparatus, a state regarding at least one item of a password policy of a password string entered on the external apparatus, and an obfuscated password string, a second acquisition unit configured to acquire a setting, which is made in the information processing apparatus, regarding the at least one item of the password policy, a determination unit configured to determine whether the obfuscated password string satisfies the password policy, based on the acquired state regarding the at least one item of the password policy of the password string, and the acquired setting regarding the at least one item of the password policy, and an update unit configured to update a password based on the obfuscated password string in a case where it is determined that the obfuscated password string satisfies the password policy.

12 Claims, 19 Drawing Sheets

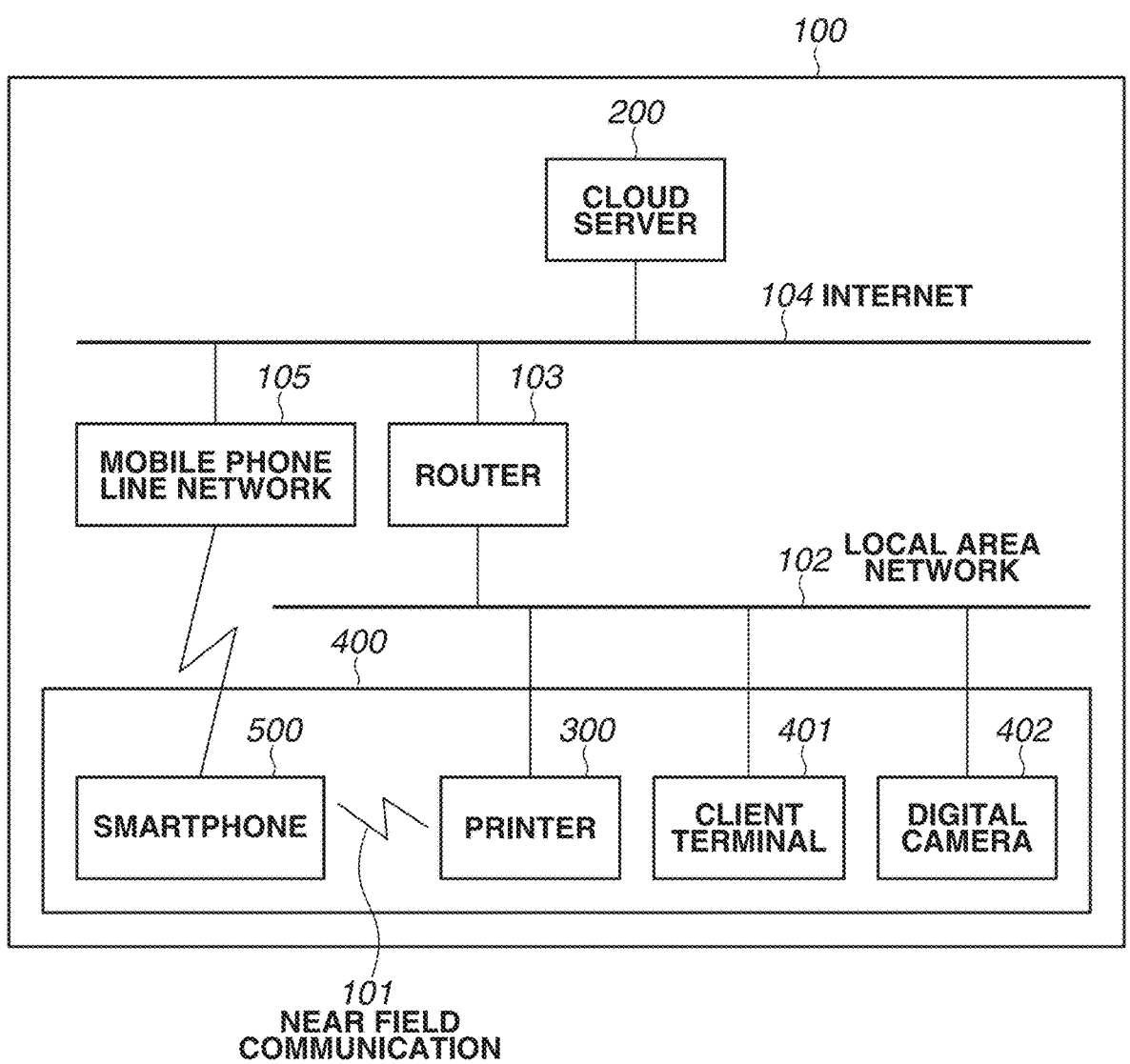

OVERALL EXTERNAL VIEW

TOP EXTERNAL VIEW

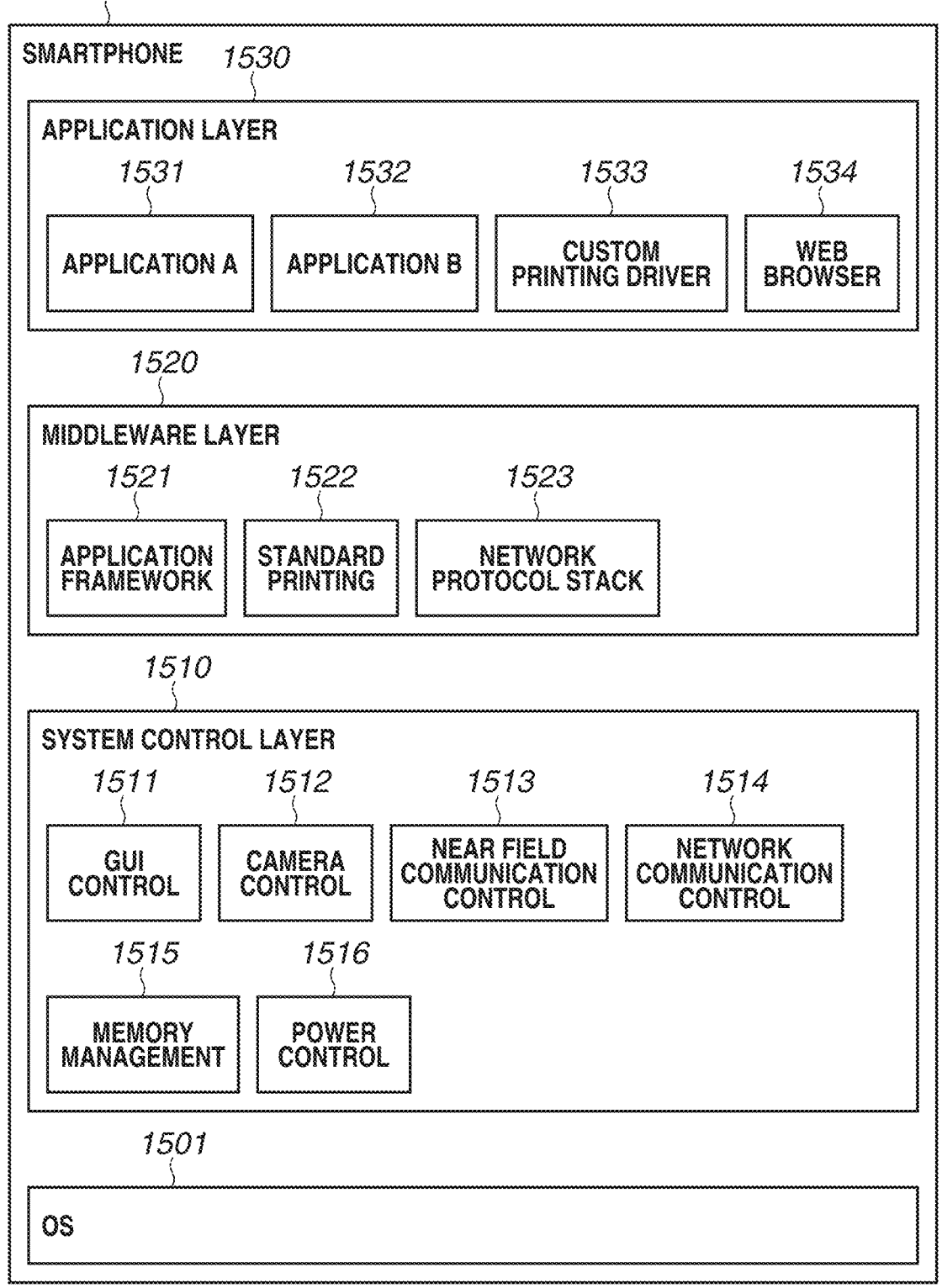

PRINTER OPERATION SETTING

EXECUTE PRINTER OPERATION CHECK AND SETTING.

- PRINT SETTING — *4401*
- PASSWORD CHANGE — *4402*
- SECURITY SETTING — *4403*
- POWER SAVING SETTING — *4404*
- RETURN — *4405*

PASSWORD CHANGE

CHANGE PASSWORD.

OLD PASSWORD ●●●●●● — *4501*

NEW PASSWORD ●●●●●●● — *4502*

CONFIRM NEW PASSWORD ●●●●●●● — *4503*

RETURN — *4504*    SET — *4505*

PASSWORD CHANGE

PASSWORD HAS BEEN CHANGED.

RETURN — 4504

PASSWORD CHANGE

PASSWORD HAS FAILED TO BE CHANGED.
SET PASSWORD SATISFYING FOLLOWING PASSWORD POLICY.
  INCLUDE 1 OR MORE NUMBERS
  INCLUDE 1 OR MORE SYMBOLS
  USE 8 OR MORE CHARACTERS

OLD PASSWORD        ●●●●●●         — 4701

NEW PASSWORD ⚠     ●●●●●●●●       — 4702

CONFIRM NEW ⚠
PASSWORD            ●●●●●●●●       — 4703

RETURN — 4704     SET — 4705

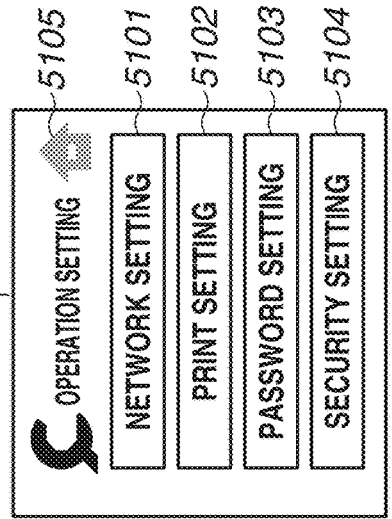
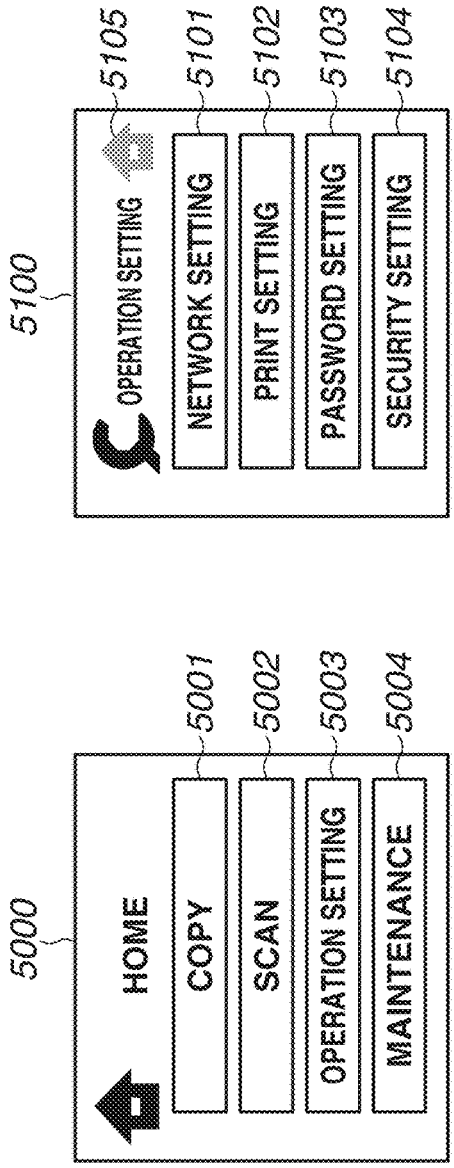
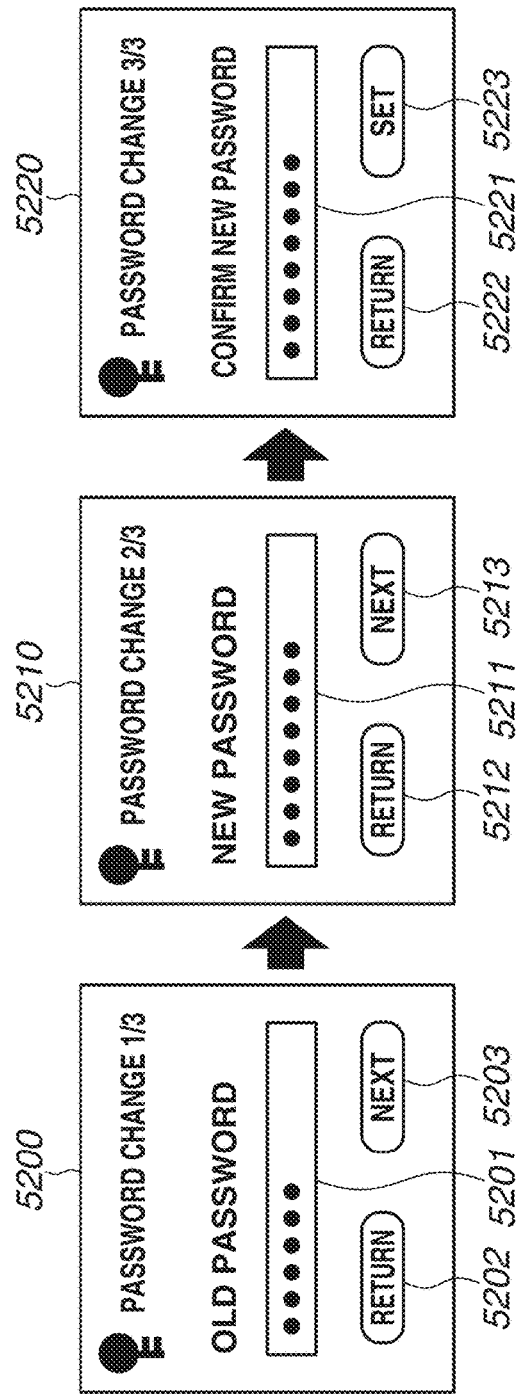

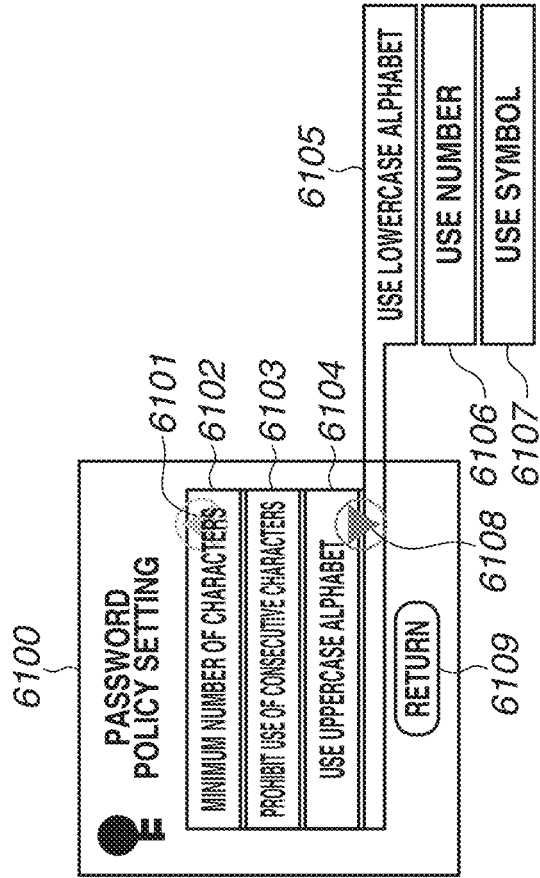
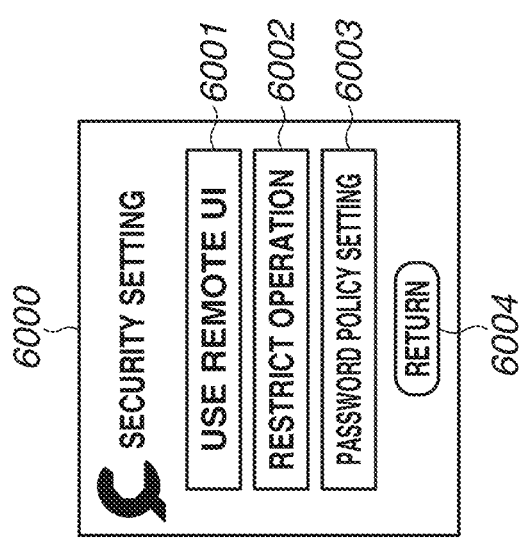

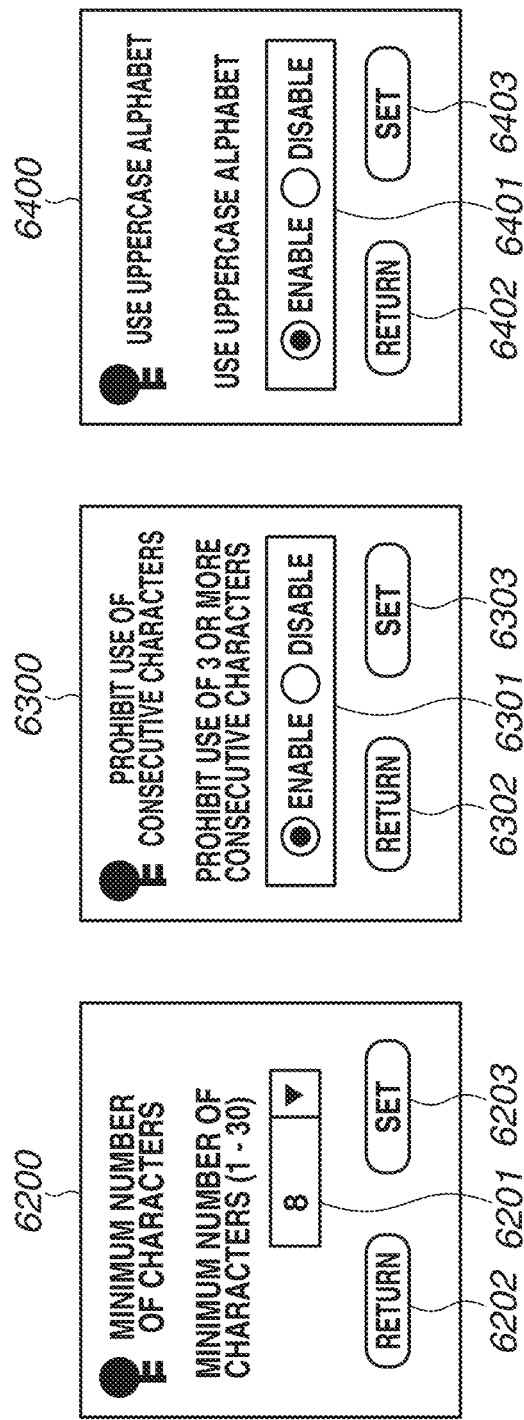

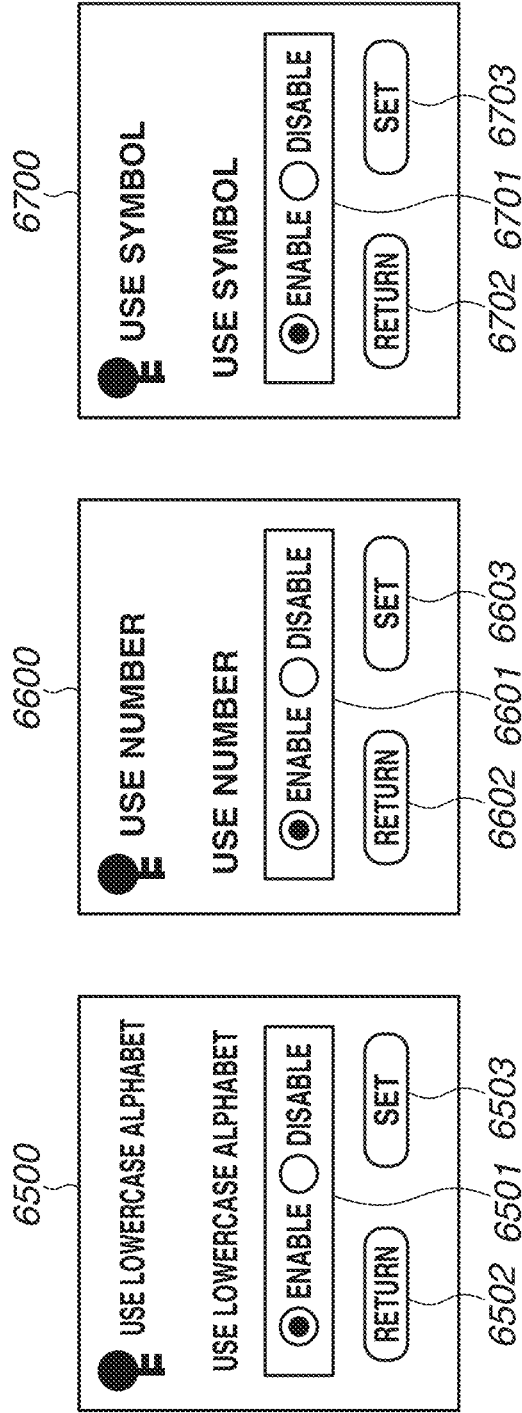

INFORMATION PROCESSING APPARATUS, INFORMATION PROCESSING METHOD, AND INFORMATION PROCESSING SYSTEM

BACKGROUND

Technical Field

The present disclosure relates to an information processing apparatus, an information processing method, and an information processing system.

Description of the Related Art

A network-connectable information processing apparatus is required to make an installation setting such as a network connection setting for the use of the apparatus, and a parameter setting for the operation of the apparatus. Some compact and inexpensive information processing apparatuses do not include a display unit or an operation unit for settings. Such an information processing apparatus is provided with a unit for making an installation setting or a parameter setting from an external apparatus connected via a network. Specifically, a screen for a setting operation is provided from an information processing apparatus to a web browser operating on an external apparatus, and an operation result indicating an operation performed on the web browser is received and reflected in the information processing apparatus. In this specification, a user interface (UI) for making various settings for an information processing apparatus that is provided on an external apparatus as described above will be described as a "remote UI". In contrast to the remote UI, an interface that receives an entry operation performed using a touch panel also having a display function and a physical switch that are provided on an information processing apparatus will be described as a "local UI".

By using the remote UI, it is possible to make an installation setting and a parameter setting even if a display screen and an entry operation unit are not provided on an information processing apparatus, whereas an external malicious third party might connect thereto via a network, and illegally view and change settings. It is therefore general that a password authentication function is provided for the use of the remote UI in such a manner as to enable only a legitimate administrator to use the remote UI. On the other hand, along with the widespread use of the Internet and wireless local area network (LAN) techniques, the types and the number of network-connectable apparatuses dramatically increase. As information processing apparatuses get more accessible in this manner, there have been an increasing number of cases where an information processing apparatus connected to a network is attacked by a malicious third party without a password being appropriately set. Thus, in network-connectable information processing apparatuses, a random password varying for each apparatus is required to be set before shipment, and a function of forcing a password change at the time of initial use is required to be provided.

For example, Japanese Patent Application Laid-Open No. 2022-31302 discusses a configuration of setting a password for the registration of user information from a remote UI of a main body apparatus at the time of initial use of an information processing apparatus, and storing the password into a corresponding storage region. With this configuration, the password becomes able to be used in subsequent processing in an authentication unit and each printing apparatus, and it is possible to enhance convenience and improve security. In recent years, products with security improved by applying a password policy defining a complicated condition based on the number of required characters, the type of characters required to be entered, and the prohibition of use of duplicative characters, at the time of password setting have become popular.

Nevertheless, in Japanese Patent Application Laid-Open No. 2022-31302, a unit of setting the security strength of a password to be entered by a user is not present, and a structure for sharing, with a local UI, a password policy also including a remote UI environment has not been constructed.

SUMMARY

According to an aspect of the present disclosure, an information processing apparatus includes at least one memory storing instructions, and at least one processor that, upon execution of the stored instructions, is configured to operate as a first acquisition unit configured to acquire, from an external apparatus, a state regarding at least one item of a password policy of a password string entered on the external apparatus, and an obfuscated password string, a second acquisition unit configured to acquire a setting, which is made in the information processing apparatus, regarding the at least one item of the password policy, a determination unit configured to determine whether the obfuscated password string satisfies the password policy, based on the acquired state regarding the at least one item of the password policy of the password string, and the acquired setting regarding the at least one item of the password policy, and an update unit configured to update a password based on the obfuscated password string in a case where it is determined that the obfuscated password string satisfies the password policy.

Further features of the present disclosure will become apparent from the following description of exemplary embodiments with reference to the attached drawings.

BRIEF DESCRIPTION OF THE DRAWINGS

FIG. 1 is a diagram illustrating a configuration of a system according to a first exemplary embodiment.

FIG. 6 is a diagram illustrating a module configuration of software operating on the smartphone according to the first exemplary embodiment.

FIGS. 7A to 7H are diagrams each illustrating a display example of a remote user interface (UI) screen according to the first exemplary embodiment.

FIGS. 8A to 8C are diagrams each illustrating a display example of a password change on a main body operation panel of the printer according to the first exemplary embodiment.

FIGS. 9A to 9H are diagrams each illustrating a display example of a password policy setting on the main body operation panel of the printer according to the first exemplary embodiment.

DESCRIPTION OF THE EMBODIMENTS

Figure 2A:
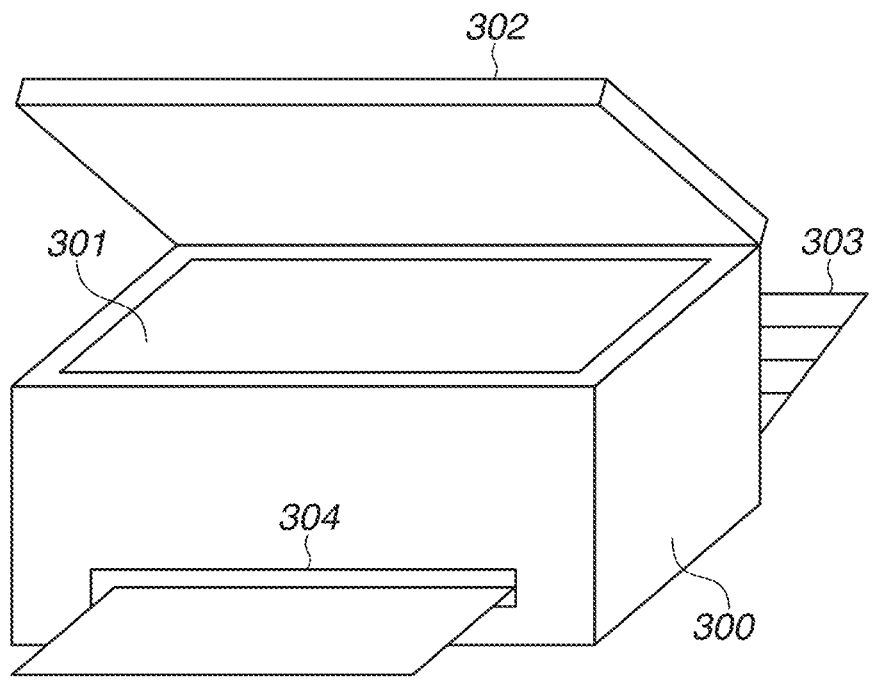
FIGS. 2A and 2B are external views of a printer according to the first exemplary embodiment.

Hereinafter, an exemplary embodiment of the present disclosure will be described with reference to the accompanying drawings. The following exemplary embodiment is not intended to limit the present disclosure set forth in the appended claims. In addition, not all the combinations of features described in the present exemplary embodiment are always essential to the solution of the present disclosure.

FIG. 1 is a diagram illustrating a configuration of a system 100 according to the present exemplary embodiment. The system 100 include a cloud server 200 and devices 400 connected via a local area network 102 and the Internet 104. The devices 400 include various network-connectable apparatuses. Examples of the devices 400 include a smartphone 500, a printer 300, a client terminal 401 such as a personal computer or a work station, and a digital camera 402. Nevertheless, types of the devices 400 are not limited to these types. For example, the devices 400 may include home electric appliances such as a refrigerator, a television, and an air conditioner. These devices 400 can be connected with each other via the local area network 102, and connect with the Internet 104 via a router 103 installed on the local area network 102.

FIG. 1 illustrates the router 103 as a device connecting the local area network 102 and the Internet 104, but the router 103 can have a wireless local area network (LAN) access point function that constructs the local area network 102. In this case, each device included in the devices 400 can be configured to participate in the local area network 102 by connecting with an access point via a wireless LAN, aside from connecting with the router 103 via a wired LAN. For example, a configuration in which the printer 300 and the client terminal 401 connect via a wired LAN, and the smartphone 500 and the digital camera 402 connect via a wireless LAN can also be employed. Each device included in the devices 400 can communicate with the cloud server 200 via the Internet 104 connected via the router 103. In addition, each device included in the devices 400 can also communicate each other via the local area network 102.

The smartphone 500 and the printer 300 can communicate with each other by near field communication 101. As the near field communication 101, wireless communication complying with Bluetooth® standard or a near field communication (NFC) standard is considered to be used. The smartphone 500 is connected also with a mobile phone line network 105, and can communicate also with the cloud server 200 via the mobile phone line network 105. This configuration indicates an example of the present disclosure, and an effect of the present disclosure remains unchanged even if a different configuration is employed. For example, an example in which the router 103 has an access point function has been described, but a device different from the router 103 may function as an access point.

Figure 2B:
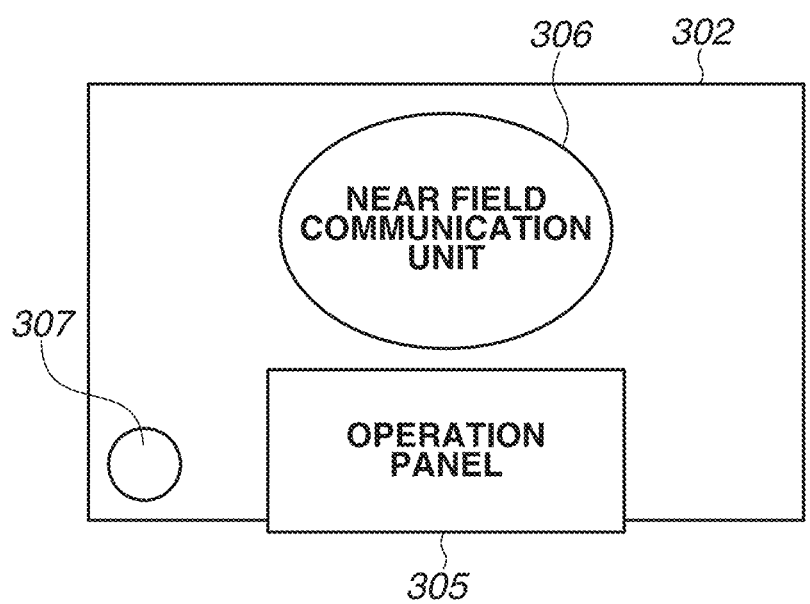

FIGS. 2A and 2B are external views of the printer 300 according to the present exemplary embodiment. In the present exemplary embodiment, a multifunction printer (multifunction peripheral (MFP)) having scanner and other functions aside from a printer function is used as an example. FIG. 2A is an overall external view of the printer 300. A platen 301 is a glass transparent table, and is to be used when a placed document is to be read using a scanner. A platen pressing plate 302 is a cover that presses a document against the platen 301 in such a manner as not to generate a space between the document and the platen 301 when the scanner reads the document, and prevents external light from entering a scanner unit. A print sheet insertion port 303 is an insertion port in which sheets with various sizes are to be set. Sheets set in the print sheet insertion port 303 are conveyed one by one to a printing unit, and discharged from a print sheet discharge port 304 after desired printing is performed.

FIG. 2B is a top external view of the printer 300. An operation panel 305 and a near field communication unit 306 are arranged on the top of the platen pressing plate 302. The operation panel 305 includes a touch panel system liquid crystal display device. On the operation panel 305, various types of display are performed, or various operations on the printer 300 and password entry are performed by the user. The near field communication unit 306 is a unit for performing near field communication, and can perform communication with a communication partner near field communication unit existing within a predetermined distance. As a wireless LAN antenna 307, an antenna for performing communication by connecting with the local area network 102 using a wireless LAN is buried.

Figure 3:
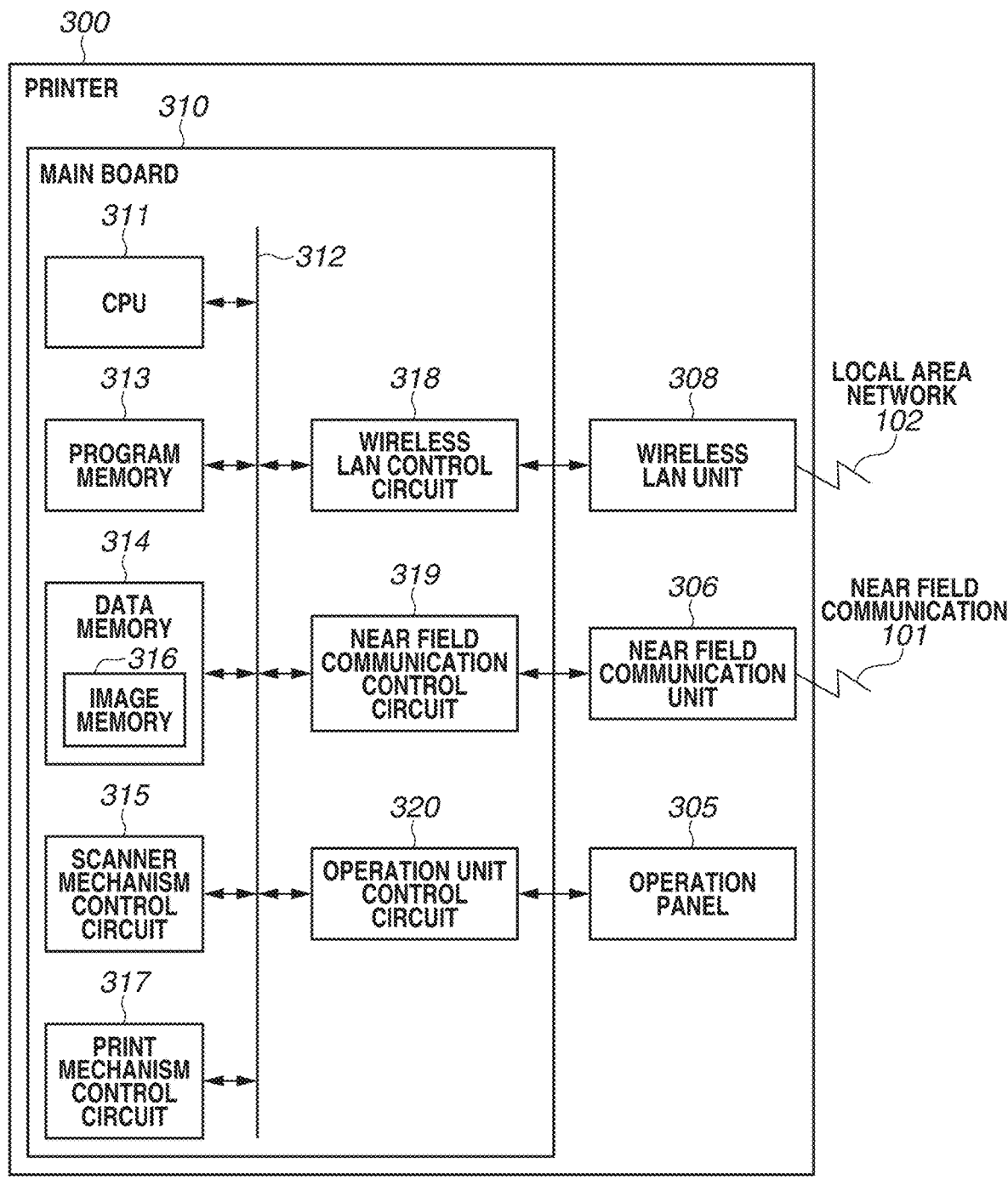
FIG. 3 is a block diagram illustrating a hardware configuration of the printer according to the first exemplary embodiment.

FIG. 3 is a block diagram illustrating a hardware configuration of the printer 300 according to the present exemplary embodiment. The printer 300 includes a main board 310 that performs the control of the entire apparatus, a wireless LAN unit 308, the near field communication unit 306, and the operation panel 305. A central processing unit (CPU) 311 that is arranged in the main board 310 and has a microprocessor configuration operates in accordance with a control program stored in a program memory 313 that is connected via an internal bus 312 and has a read-only memory (ROM) configuration, and content in a data memory 314 having a random access memory (RAM) configuration. The CPU 311 controls a scanner mechanism control circuit 315 to read a document, and stores the read data into an image memory 316 in the data memory 314. The CPU 311 can also control a print mechanism control circuit 317 to print an image stored in the image memory 316 in the data memory 314, onto a recording medium.

The CPU 311 performs wireless LAN communication with a different communication terminal device by controlling the wireless LAN unit 308 via a wireless LAN communication control circuit 318. The CPU 311 can also detect connection with a different near field communication terminal and perform data transmission and reception with a different near field communication terminal by controlling the near field communication unit 306 via a near field communication control circuit 319. The CPU 311 can display the state of the printer 300 and a function selection menu on the operation panel 305 and receive operations from the user by controlling an operation unit control circuit 320.

Figure 4:
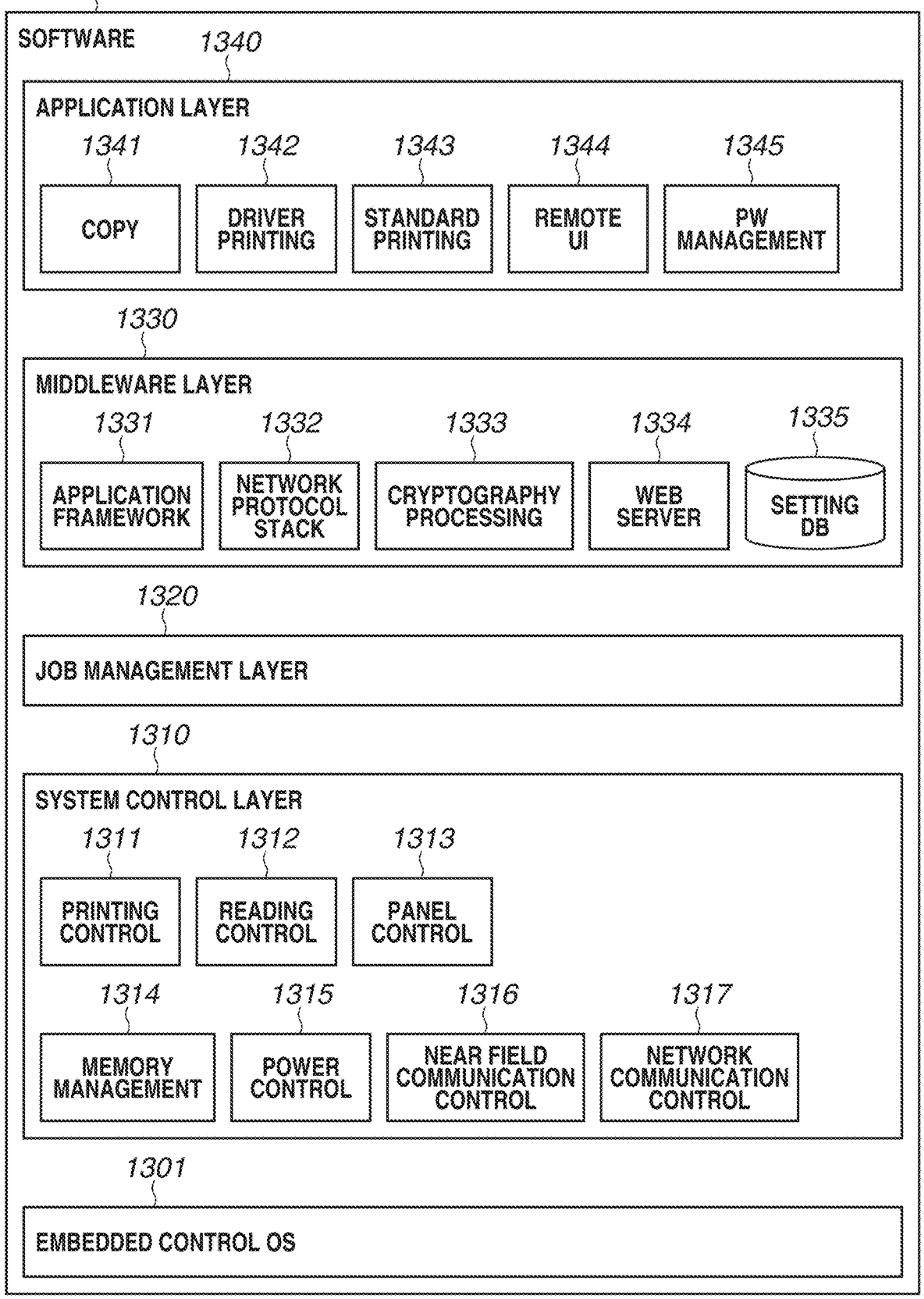
FIG. 4 is a diagram illustrating a module configuration of software operating on the printer according to the first exemplary embodiment.

FIG. 4 is a diagram illustrating a module configuration of software operating on the printer 300 according to the present exemplary embodiment. Software 1300 operating on the printer 300 operates on an embedded control operating system (OS) 1301. Modules are broadly divided into a system control layer 1310, a job management layer 1320, a middleware layer 1330, and an application layer 1340. The embedded control OS 1301 is an OS that governs basic operations of the printer control software 1300. Generally, a real-time OS excellent in responsivity is used as the embedded control OS 1301.

The system control layer 1310 includes modules that mainly govern hardware control of the printer 300. A printing control module 1311 is a control module for causing the printer 300 to execute a printing operation by controlling the print mechanism control circuit 317. A reading control module 1312 is a control module for executing a reading operation of a document placed on the platen 301, by controlling the scanner mechanism control circuit 315. A panel control module 1313 is a control module for controlling the display on the operation panel 305 of the printer 300 and detecting various key operations. A memory management module 1314 is a control module for performing the management of dynamic allocation of the data memory 314 and the image memory 316. A power control module 1315 is a control module for performing power control of the printer 300, supplying power necessary for operations to each hardware block, and performing power saving mode control.

A near field communication control module 1316 is a control module for performing communication with a terminal device such as the smartphone 500 by controlling the near field communication unit 306. A network communication control module 1317 is a control module for performing communication physical layer control to perform LAN communication with an external apparatus by controlling the wireless LAN unit 308. The job management layer 1320 includes modules that execute various operations using the system control layer 1310 while performing hardware resource allocation, exclusive control, and scheduling in response to job execution requests from a higher layer.

The middleware layer 1330 is positioned between the application layer 1340 and the job management layer 1320, and includes modules to be used in common by a plurality of functional modules included in the application layer 1340. An application framework 1331 is a framework module to be used in common when a job execution request is issued from the application layer 1340 to the job management layer 1320. A network protocol stack 1332 is a module for performing communication in compliance with various network protocols such as a HyperText Transfer Protocol (HTTP) and a Transmission Control Protocol/Internet Protocol (TCP/IP). A cryptography processing module 1333 is a module for performing encipherment, decoding, and obfuscation processing of a password entered from a local user interface (UI), which are required in network communication.

A web server module 1334 is a module for operating the printer 300 as a web server to distribute remote UI content. A setting DB module 1335 is a module that provides a database (hereinafter, will be described as a setting DB) storing various settings to be required when the printer 300 operates, and saved information to be referred to during operations, and various functions for accessing the DB. For example, wireless LAN access point information for network connection, administrator password information to authenticate access from a remote UI, and the setting of a password policy to be set by an administrator in the printer 300 are stored. The setting DB module 1335 also provides a reference function for referring to these setting items and a registration function for updating the setting items, and enables access from the application layer 1340 to be described below.

The application layer 1340 includes applications that implement various functions of the printer 300. A copy application 1341 is an application module for executing a copy operation of reading and printing a document. A driver printing application 1342 is an application module for executing an operation upon receiving a job from a printer driver of the smartphone 500 or a client terminal 401. Jobs from a driver include a print job for executing a printing operation, a scan job for reading a document and outputting image data, and a maintenance job for performing the setting and management of the printer 300 by communicating information with an external apparatus.

A standard printing application 1343 is an application module for executing an operation upon receiving a job from a standard printing service provided by a system of the smartphone 500. Jobs from the standard printing service include a print job for executing a printing operation, and a scan job for reading a document and outputting image data. Nevertheless, because the standard printing service is provided by a smartphone manufacturer or a standard OS vendor, restrictions are imposed in such a manner that the setting and management that are unique to a printer model type of each manufacturer cannot be performed. A remote UI module 1344 is a module that provides an external apparatus with a remote UI function included in the printer 300, using the web server module 1334. By using a remote UI, it becomes possible to perform the setting and management of the printer 300. Especially in the printer 300 described in the present exemplary embodiment, because information displayable or settable on the operation panel 305 is limited, a remote UI is used to perform more detailed setting and management. In a case where a dedicated driver is not prepared for the smartphone 500 or the client terminal 401, because only the standard printing service can be provided, the use of the remote UI becomes essential to perform detailed setting and management.

A PW management module 1345 is an application module for executing registration, update, and authentication of a password of an administrator and passwords of general users. The PW management module 1345 receives a password registration/update request from a remote UI or a local UI, acquires the setting of a password policy from the setting DB module 1335, and performs satisfaction determination as to whether a password satisfying the password policy is set. In a case where a password satisfying the password policy is set, a password is updated using a registration function provided by the setting DB module 1335 arranged in the middleware layer 1330.

Figure 5:
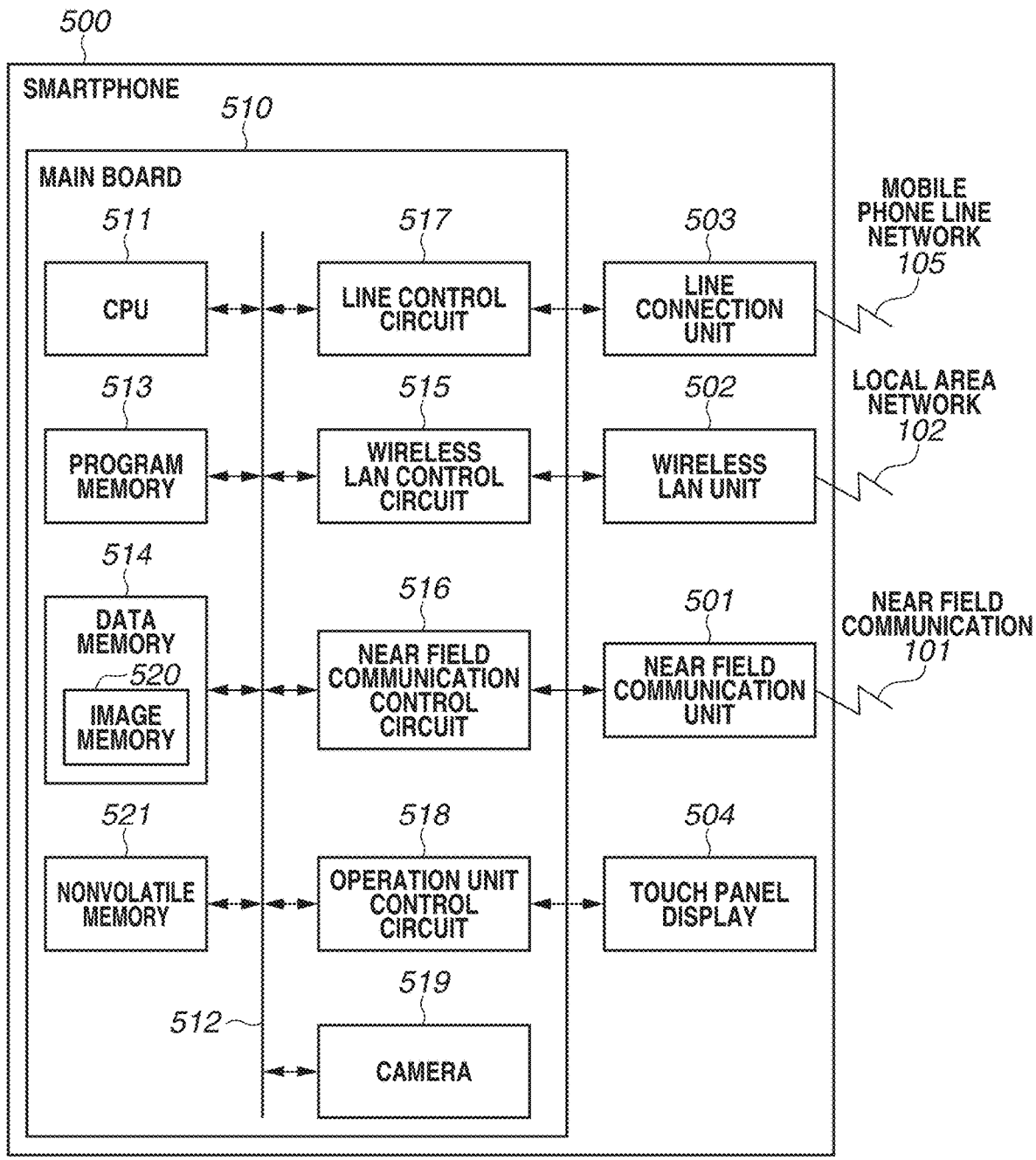
FIG. 5 is a block diagram illustrating a hardware configuration of a smartphone according to the first exemplary embodiment.

FIG. 5 is a block diagram illustrating a hardware configuration of the smartphone 500 according to the present exemplary embodiment. The smartphone 500 includes a main board 510 that performs the control of the entire apparatus, a wireless LAN unit 502, a near field communication unit 501, a line connection unit 503, and a touch panel display 504. A CPU 511 that is arranged in the main board 510, and has a microprocessor configuration operates in accordance with a control program stored in a program memory 513 that is connected via an internal bus 512, and has an ROM configuration, and content in a data memory 514 having an RAM configuration. The CPU 511 performs wireless LAN communication with a different communication terminal device by controlling the wireless LAN unit 502 via a wireless LAN control circuit 515.

The CPU 511 can detect connection with a different near field communication terminal and perform data transmission and reception with a different near field communication terminal by controlling the near field communication unit 501 via a near field communication control circuit 516. The CPU 511 can also make a phone call and perform data transmission and reception by controlling the line connection unit 503 via a line control circuit 517 to connect to the mobile phone line network 105. The CPU 511 can perform desired display on the touch panel display 504 or receive operations from the user by controlling an operation unit control circuit 518. The CPU 511 can capture an image by controlling a camera 519, and stores the captured image into an image memory 520 in a data memory 514. Aside from captured images, images acquired from the outside via the mobile phone line network 105, the local area network 102, and the near field communication 101 can also be stored in the image memory 520, or transmitted to the outside instead.

A nonvolatile memory 521 includes a flash memory or the like, and stores data desired to be stored even after the power is turned off. For example, aside from address book data, various types of communication connection information, and device information regarding devices connected in the past, image data desired to be stored, or application software for causing the smartphone 500 to implement various functions is stored.

FIG. 6 is a diagram illustrating a module configuration of software operating on the smartphone 500. Software 1500 operating on the smartphone 500 operates on an OS 1501. Modules are broadly divided into a system control layer 1510, a middleware layer 1520, and an application layer 1530.

The system control layer 1510 includes modules that mainly govern hardware control of the smartphone 500. A GUI control module 1511 is a control module for controlling display on the touch panel display 504 and detecting a touch panel operation. A camera control module 1512 is a control module that controls image capturing to be executed by the camera 519. A near field communication control module 1513 is a control module for performing near field communication with a different apparatus by controlling the near field communication unit 501. A network communication control module 1514 is a control module for performing communication physical layer control for performing LAN communication with an external apparatus by controlling the wireless LAN unit 502. A memory management module 1515 is a control module for performing the management of dynamic allocation of the data memory 514 and the image memory 520. A power control module 1516 is a control module for performing power control of the smartphone 500, supplying power necessary for operations to each hardware block, and performing power saving mode control.

The middleware layer 1520 is positioned between the application layer 1530 and the system control layer 1510, and includes modules to be used in common by a plurality of application modules included in the application layer 1530. An application framework 1521 is a framework module to be used in common by applications in the application layer 1530. A network protocol stack 1523 is a module for performing communication in compliance with various network protocols such as the HTTP and the TCP/IP. A standard printing service 1522 is a service module that provides applications in the application layer 1530 with functions of using the printer 300 supporting the standard printing service. Functions to be provided by the standard printing service 1522 include a print function that causes the printer 300 to execute a print job, and a scan function that causes the printer 300 to execute a scan job. Nevertheless, because the standard printing service is provided by a smartphone manufacturer or a standard OS vendor, restrictions are imposed in such a manner that the setting and management that are unique to a printer model type of each manufacturer cannot be performed.

The application layer 1530 includes applications that implement various functions of the smartphone 500. The applications installed on the smartphone 500 include applications embedded from the product shipment, and applications that can be introduced by being downloaded afterward by the user. FIG. 6 illustrates an application A 1531 and an application B 1532, but the number and types of applications to be added are not limited, and an application can be added or deleted by the user as necessary. A custom printing driver 1533 is a dedicated driver adapted to the model type of the printer 300, and provides a function of causing the corresponding printer 300 to execute a print job and a scan job. The user selects the custom printing driver 1533 suitable for the model type of the printer 300 to be used by the user, and installs and uses the selected custom printing driver 1533. FIG. 6 illustrates an example in which the custom printing driver 1533 is installed in the application layer 1530, but the custom printing driver 1533 may be installed in the middleware layer 1520, and be configured to operate upon receiving a print job request from an application. A web browser 1534 is an application module that connects to a web server via a network, acquires web content, and displays the web content. The web browser 1534 can also acquire and display web content in the cloud server 200, and can also acquire and display remote UI content using a web server function of the printer 300.

Figure 7A:
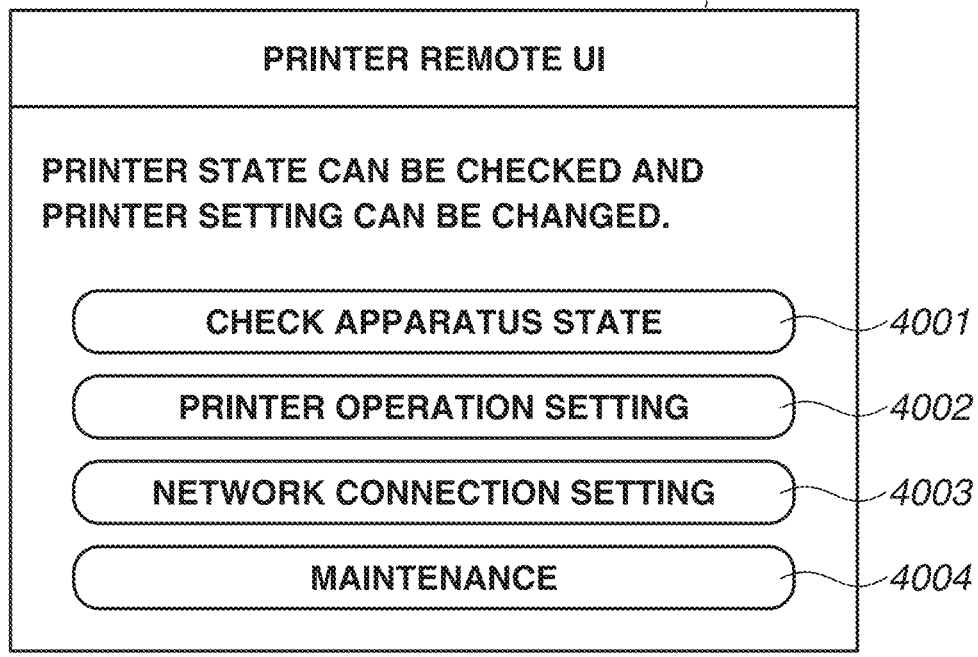

FIGS. 7A to 7H are diagrams each illustrating a display example on a remote UI screen according to the present exemplary embodiment. FIG. 7A is a diagram illustrating an example of a screen 4000 on which a remote UI is not restricted. The unrestricted screen 4000 is a page that serves as a gateway to the entire remote UI, and is to be displayed in a case where a password has been authenticated. Buttons 4001, 4002, 4003, and 4004 assigned hyperlinks for transitioning to different pages are arranged on the unrestricted screen 4000. The button 4001 is a button for transitioning to a printer state display screen (not illustrated).

The button 4002 is a button for transitioning to a printer operation setting screen (not illustrated). The button 4003 is a button for transitioning to a network connection setting screen (not illustrated). The button 4004 is a button for transitioning to a maintenance function screen (not illustrated).

Figure 7B:
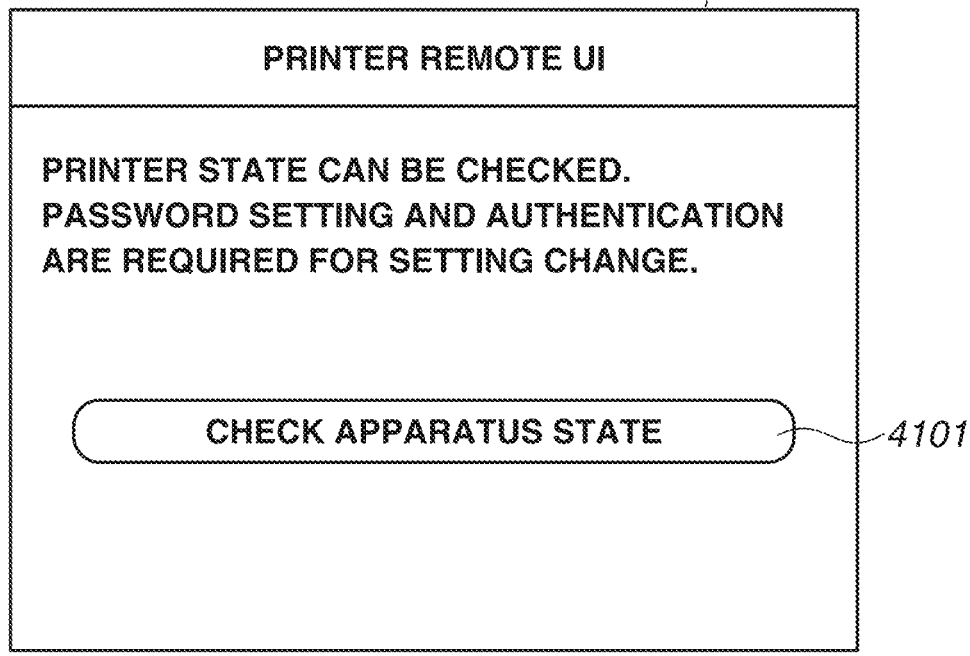

FIG. 7B is a diagram illustrating an example of a screen 4100 on which a remote UI is restricted. The restricted screen 4100 is a gateway page to be displayed in place of the unrestricted screen 4000 in a state in which a password has not been authenticated, or in a case where a password has not been changed from a factory shipment state. Hereinafter, in this specification, a state in which a password has not been changed from a factory shipment state will be described as a "default state". A button 4101 assigned a hyperlink for transitioning to a different page is arranged on the restricted screen 4100. The button 4101 is a button for transitioning to a printer state display screen (not illustrated). In this manner, it can be seen that buttons for transitioning to the printer operation setting screen, the network connection setting screen, and a security setting screen are not arranged on the restricted screen 4100. A remote attacker is prevented from illegally changing a printer operation setting and a network connection setting in a state in which a password has not been authenticated, or in a case where an operation is executed in the default state.

Figure 7C:
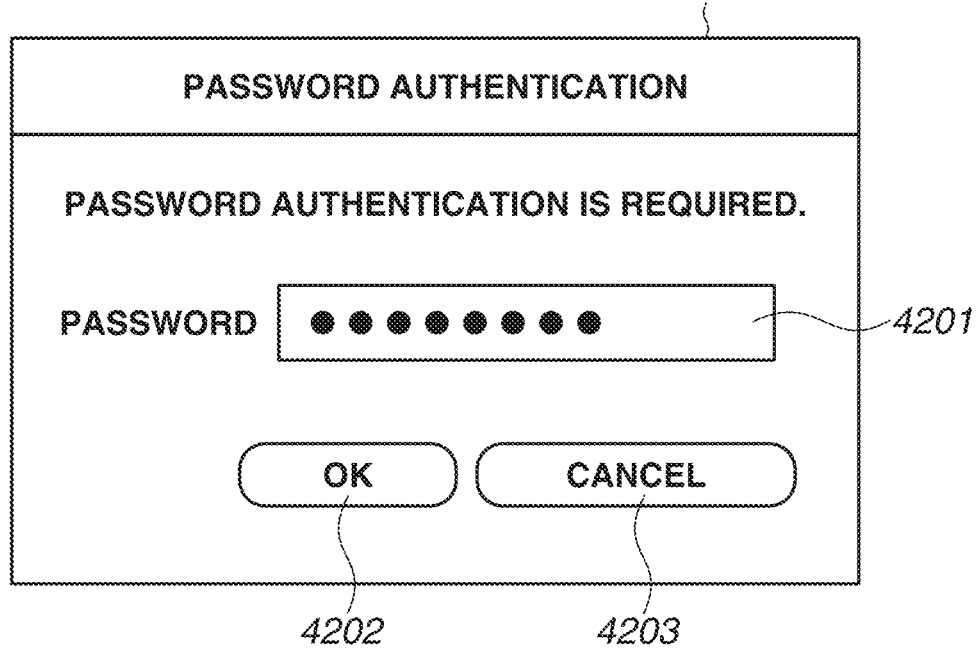

FIG. 7C is a diagram illustrating an example of a password authentication screen 4200. The password authentication screen 4200 is a screen to be displayed if a request for access to a remote UI is issued in a state in which a password has not been authenticated. A password field 4201 is a character string entry field for entering a password to be authenticated. In this example, an entered password is displayed after being converted into filled circles in such a manner that someone does not peep at the entered password by peeping into a terminal of the user. An OK button 4202 is a button for transmitting an authentication request for authentication execution based on the entered password. A cancel button 4203 is a button for cancelling authentication and returning to restricted remote UI access. By entering a password into the password field 4201 and pressing the OK button 4202, the user can transmit an authentication request. If the authentication request is permitted, the password authentication screen 4200 transitions to a page screen of a remote UI that has been originally requested.

Figure 7D:
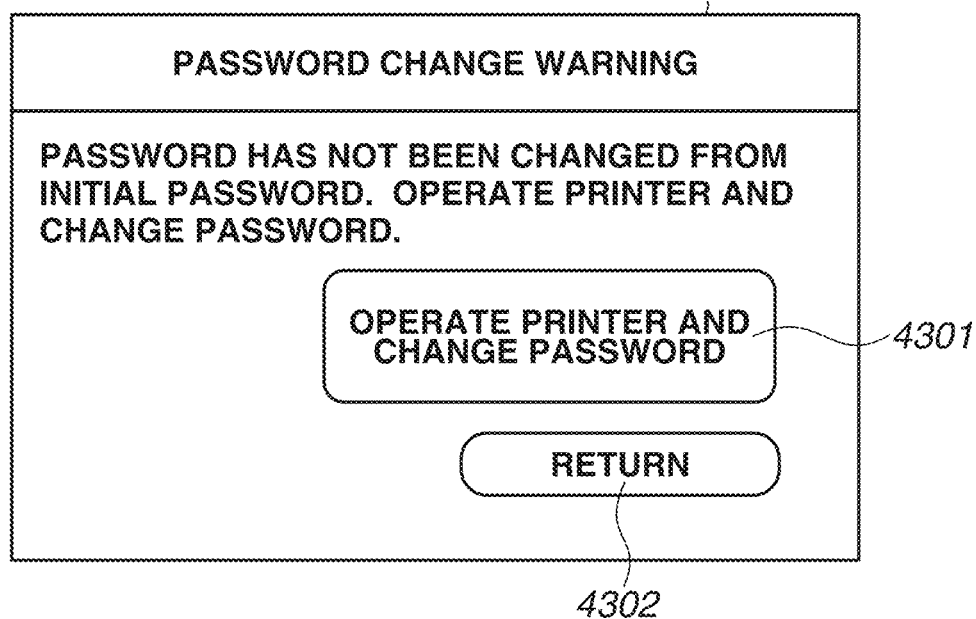

FIG. 7D is a diagram illustrating an example of a password change warning screen 4300. The password change warning screen 4300 is a screen to be displayed if a request for access to a remote UI is issued in the default state. A change button 4301 is a button for displaying a password change screen on the operation panel 305 of the printer 300. A return button 4302 is a button for ending the password change warning screen 4300 and returning to restricted remote UI access.

FIG. 7E is a diagram illustrating an example of a printer operation setting screen 4400. The printer operation setting screen 4400 is displayed if the printer operation setting button 4002 on the unrestricted remote UI screen 4000 is pressed. Buttons 4401, 4402, 4403, and 4404 for selecting setting items related to operations of the printer 300, and a return button 4405 for returning to the previous screen are provided on the printer operation setting screen 4400. If the print setting button 4401 is pressed, the screen transitions to a screen for making a print setting such as a sheet size or a sheet type to be used by the printer 300 for printing. If the password change button 4402 is pressed, the screen transitions to a password change screen 4500 to be described below. If the security setting button 4403 is pressed, the screen transitions to a menu screen for selecting a screen for setting restriction of operations or a password policy. If the power saving setting button 4404 is pressed, the screen transitions to a screen for making a setting related to operations such as a time until sleep, automatic power-off, and automatic power-on.

FIG. 7F is a diagram illustrating an example of the password change screen 4500. The password change screen 4500 is displayed if the password change button 4402 on the printer operation setting screen 4400 is pressed. Entry fields 4501, 4502, and 4503 necessary for a password change, a return button 4504 for returning to the previous screen, and a setting button 4505 for determining the entry are provided on the password change screen 4500. If entry into all the entry fields is completed and the setting button 4505 is pressed, processing of verifying whether an entered password is correct operates. These pieces of processing will be described in detail below. The password change screen 4500 is a display example on the web browser 1534 operating on the smartphone 500. A password change can be similarly made even by using a local UI on the operation panel 305 included in the printer 300. Although a remote UI and a local UI include different components on screens due to differences in display regions and operation methods, operations to be performed during a series of operations related to the password change are the same, and operations related to the password policy are similar as well. A password change on a local UI will be described below with reference to FIGS. 8A to 8C.

FIG. 7G is a diagram illustrating an example of a password change completion screen 4600. The password change completion screen 4600 is displayed if the password change is completed through password change processing completed by pressing the setting button 4505 on the password change screen 4500. A message indicating that the password change has been completed is displayed on the password change completion screen 4600, and by pressing the return button 4504, the screen returns to the previous screen.

FIG. 7H is a diagram illustrating an example of a password change failure screen 4700. The password change failure screen 4700 is displayed in a case where the password change has failed through the password change processing completed by pressing the setting button 4505 on the password change screen 4500. Entry fields 4701, 4702, and 4703 necessary for a password re-change, a return button 4704 for returning to the previous screen, and a setting button 4705 for determining the entry are provided on the password change failure screen 4700. A reason for a failure in password change is displayed, and unsatisfied password policy items are listed on the password change failure screen 4700 illustrated in FIG. 7H. In the display example illustrated in FIG. 7H, it is displayed that, among password policy items to be satisfied, a policy item regarding the minimum number of characters is unsatisfied, and a policy item regarding the inclusion of one or more numbers and a policy item regarding the inclusion of one or more symbols are unsatisfied. In addition, a field requiring the user to correct entry is assigned an exclamation mark or no entry icon that serves as a mark for attracting attention. In the present exemplary embodiment, a field is assigned an exclamation mark explicitly notifying the user that correction is to be performed. The user executes a password change again by reentering a password corrected based on the reason for a failure in password change, into each entry field, and pressing the setting button 4705.

FIGS. 8A to 8C are diagrams each illustrating an example of a password change to be made after a home screen has transitioned to a setting screen among local UI screens on the operation panel 305 of the printer 300 according to the present exemplary embodiment. FIG. 8A is a diagram illustrating an example of a home screen 5000. The home screen 5000 is a screen to be displayed when the printer 300 is in a standby state, and a function execution instruction from the user can be received thereon.

Buttons 5001, 5002, 5003, and 5004 for selecting functions to be executed are provided on the home screen 5000. If the copy button 5001 is pressed, the screen transitions to a screen for executing a copy function. If the scan button 5002 is pressed, the screen transitions to a screen for executing a scan function. If the operation setting button 5003 is pressed, the screen transitions to an operation setting menu screen 5100 to be described below. If the maintenance button 5004 is pressed, the screen transitions to a screen for executing a maintenance function.

FIG. 8B is a diagram illustrating an example of the operation setting menu screen 5100. The operation setting menu screen 5100 is displayed if the operation setting button 5003 on the home screen 5000 is pressed. Buttons 5101, 5102, 5103, and 5104 for selecting items to be set, and a home button 5105 for transitioning to the home screen 5000 are provided on the operation setting menu screen 5100. If the network setting button 5101 is pressed, the screen transitions to a screen for making a setting for connecting the printer 300 to a network. If the print setting button 5102 is pressed, the screen transitions to a screen for making a print setting such as a sheet size or a sheet type to be used by the printer 300 for printing. If the password change 5103 is pressed, the screen transitions to a password change screen 5200 to be described below.

FIG. 8C is a diagram illustrating an example of password change screens 5200, 5210, and 5220. The password change screens 5200, 5210, and 5220 are screens to be displayed when a password is to be changed, and an old password and a new password are entered thereon. In the present exemplary embodiment, because a display region of the operation panel 305 of the printer 300 is limited, FIG. 8C illustrates a case where respective items are entered on the three screens. Next buttons 5203 and 5213 are buttons for transitioning to the next screen.

A return button 5202 on the password change screen 5200 to be displayed first is a button for stopping the password change processing. Return buttons 5212 and 5222 on the password change screens 5210 and 5220 to be displayed secondly or later are buttons for transitioning to the previous screen. A setting button 5223 on the password change screen 5220 to be displayed last is a button for issuing a password change instruction based on entered information. An old password field 5201 is a character string entry field for entering an unchanged password. A new password field 5211 is a character string entry field for entering a changed password. A new password confirmation field 5221 is a character string entry field for confirming the changed password. Characters included in a password are entered into each field using a character entry unit (not illustrated).

As the character entry unit, hardware keys may be provided or a software keyboard displayed on a screen may be used. The unchanged password entered in the old password field 5201 is used to verify that a user who tries to change the password is a legitimate user. The new password entered in the new password confirmation field 5221 is used to verify that no entry mistake is made, by confirming that the entered character string is identical to a character string entered in the new password field 5211. In this example, the description has been given of a case where the three password change screens 5200, 5210, and 5220 are sequentially displayed and new and old passwords are entered for a password change, but three passwords including new and old passwords may be entered on one password change screen.

If access to a remote UI is made in the default state, the password change warning screen 4300 is displayed, and if the change button 4301 is pressed, the password change screen 5200 is displayed on the operation panel 305 of the printer 300. If the user enters an old password, a new password, and new password confirmation information in accordance with instructions on the password change screens 5200, 5210, and 5220 on the operation panel 305, the password is changed, and the unrestricted remote UI screen 4000 becomes accessible. At the time, password policy satisfaction determination is performed on the changed password by the PW management module 1345, and in a case where the password is determined to satisfy the password policy, password information in the setting DB 1335 is updated and used in subsequent administrator authentication.

FIGS. 9A to 9H are diagrams each illustrating an example of a screen for making a password policy setting from a security setting, among local UI screens on the operation panel 305 of the printer 300 according to the present exemplary embodiment. FIG. 9A is a diagram illustrating an example of a security setting menu screen 6000. The security setting menu screen 6000 is displayed if the security setting button 5104 on the operation setting menu screen 5100 is pressed. Buttons 6001, 6002, 6003 for selecting security setting items, and a return button 6004 for returning to the previous screen are provided on the security setting menu screen 6000. If the remote UI use button 6001 is pressed, the screen transitions to a screen for making a setting as to whether to permit the use of a remote UI. If the operation restriction button 6002 is pressed, the screen transitions to a screen for setting functional operation restriction of the printer 300. If the password policy setting button 6003 is pressed, the screen transitions to a password policy setting menu screen 6100 to be described below.

FIG. 9B is a diagram illustrating an example of the password policy setting menu screen 6100. The password policy setting menu screen 6100 is displayed if the password policy setting button 6003 on the security setting menu screen 6000 is pressed. Buttons 6102, 6103, 6104, 6105, 6106, and 6107 for selecting password policy setting items are arranged on the password policy setting menu screen 6100. In addition, a return button 6109 for returning to the previous screen, and an up button 6101 and a down button 6108 for changing a selected password policy setting button are provided. If the minimum number of characters button 6102 is pressed, the screen transitions to a minimum number of characters setting screen 6200 to be described below. If the consecutive characters use prohibition button 6103 is pressed, the screen transitions to a consecutive characters use prohibition setting screen 6300 to be described below. If the uppercase alphabet use button 6104 is pressed, the screen transitions to an uppercase alphabet use setting screen 6400 to be described below. If the lowercase alphabet use button 6105 is pressed, the screen transitions to a lowercase alphabet use setting screen 6500 to be described below. If the number use button 6106 is pressed, the screen transitions to a number use setting screen 6600. If the symbol use button 6107 is pressed, the screen transitions to a symbol use setting screen 6700. On the password policy setting menu screen 6100 according to the present exemplary embodiment, buttons for transitioning to six password policy setting screens are arranged. In a case where all of these buttons do not fall within the operation panel 305, by displaying the buttons while scrolling the screen, it becomes possible for the user to select buttons that had been out of the screen, and by pressing these buttons, it becomes possible to transition to the corresponding setting screens. The scrolling is performed by pressing the up button 6101 and the down button 6108. Alternatively, the scrolling can be similarly performed also by a method of flicking a display portion of a button in such a manner as to trace the portion with a fingertip.

FIG. 9C is a diagram illustrating an example of the minimum number of characters setting screen 6200. The minimum number of characters setting screen 6200 is displayed if the minimum number of characters button 6102 on the password policy setting menu screen 6100 is pressed. An entry field 6201 for setting the minimum number of characters and a return button 6202 for returning to the previous screen are provided on the minimum number of characters setting screen 6200. In the present exemplary embodiment, the minimum number of characters is set within the range between one character to 30 characters, and numerical entry can be performed by using a software keyboard or by selecting a number from a drop-down list displayed by pressing a drop-down button provided at the right end of an entry field. By pressing a setting button 6203 after the minimum number of characters is entered or selected, the setting is determined.

FIG. 9D is a diagram illustrating an example of the consecutive characters use prohibition setting screen 6300. The consecutive characters use prohibition setting screen 6300 is displayed if the consecutive characters use prohibition button 6103 on the password policy setting menu screen 6100 is pressed. Radio buttons 6301 for enabling or disabling consecutive characters use prohibition and a return button 6302 for returning to the previous screen are provided on the consecutive characters use prohibition setting screen 6300. In the present exemplary embodiment, the number of characters prohibited to be consecutively used is set to three. By pressing a setting button 6303 after selecting whether to enable or disable the prohibition of use of three consecutive characters, the setting is determined.

FIG. 9E is a diagram illustrating an example of the uppercase alphabet use setting screen 6400. The uppercase alphabet use setting screen 6400 is displayed if the uppercase alphabet use button 6104 on the password policy setting menu screen 6100 is pressed. Radio buttons 6401 for setting whether to force the use of an uppercase alphabet, and a return button 6402 for returning to the previous screen are provided on the uppercase alphabet use setting screen 6400. In the present exemplary embodiment, by pressing a setting button 6403 after selecting whether to enable or disable the forced use of an uppercase alphabet, the setting is determined.

FIG. 9F is a diagram illustrating an example of the lowercase alphabet use setting screen 6500. The lowercase alphabet use setting screen 6500 is displayed if the lowercase alphabet use button 6105 on the password policy setting menu screen 6100 is pressed. Radio buttons 6501 for setting whether to force the use of a lowercase alphabet, and a return button 6502 for returning to the previous screen are provided on the lowercase alphabet use setting screen 6500. In the present exemplary embodiment, by pressing a setting button 6503 after selecting whether to enable or disable the forced use of a lowercase alphabet, the setting is determined.

FIG. 9G is a diagram illustrating an example of the number use setting screen 6600. The number use setting screen 6600 is displayed if the number use button 6106 on the password policy setting menu screen 6100 is pressed. Radio buttons 6601 for setting whether to force the use of a number, and a return button 6602 for returning to the previous screen are provided on the number use setting screen 6600. In the present exemplary embodiment, by pressing a setting button 6603 after selecting whether to enable or disable the forced use of a number, the setting is determined.

FIG. 9H is a diagram illustrating an example of the symbol use setting screen 6700. The symbol use setting screen 6700 is displayed if the symbol use button 6107 on the password policy setting menu screen 6100 is pressed. Radio buttons 6701 for setting whether to force the use of a symbol, and a return button 6702 for returning to the previous screen are provided on the symbol use setting screen 6700. In the present exemplary embodiment, by pressing a setting button 6703 after selecting whether to enable or disable the forced use of a symbol, the setting is determined.

Figure 10:
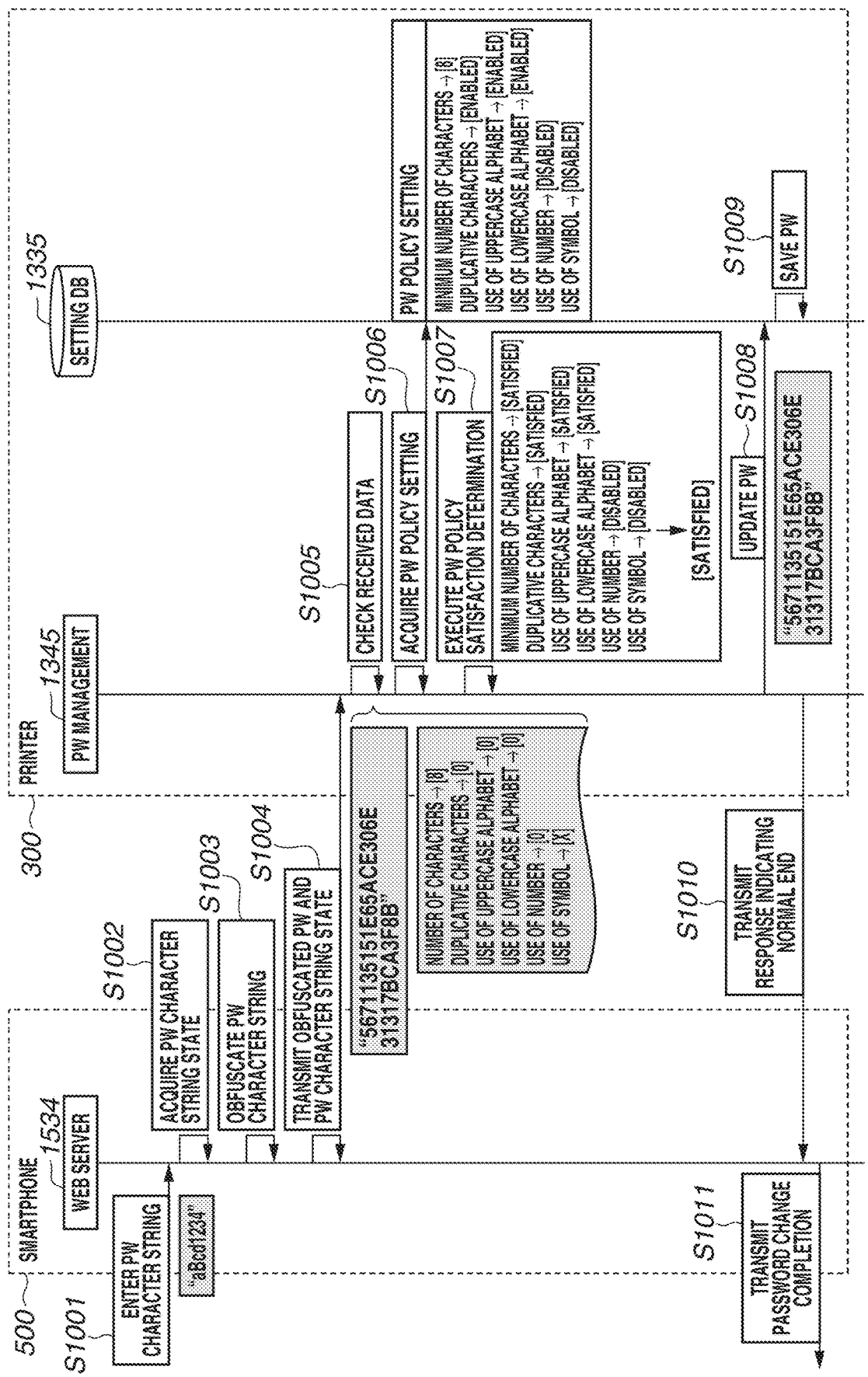
FIG. 10 is a sequence diagram illustrating information communication to be executed with the smartphone at the time of password change according to the first exemplary embodiment.

FIG. 10 is a diagram illustrating a sequence to execute a password change via a remote UI using the web browser 1534 operating on the smartphone 500 according to the present exemplary embodiment. FIG. 10 illustrates a sequence in which password policy satisfaction determination is executed by the PW management module 1345 and a password policy is determined to be satisfied, and the sequence will be described in detail below.

To start the sequence illustrated in FIG. 10, first of all, the smartphone 500 connects to the local area network 102 to which the printer 300 is connected. In the present exemplary embodiment, simultaneously with connecting to the Internet 104, the router 103 can access, via a wireless LAN, each device included in the devices 400 in the local area network 102 using a wireless LAN access point function. In the present exemplary embodiment, the web browser 1534 operating on the smartphone 500 is used, but a web browser on a PC operating as the client terminal 401 may be used.

In the printer 300, an administrator password has already been changed from an initial password by the user on a local UI. In this example, a password is assumed to be changed after the setting of a password policy is reviewed as part of security improvement. A password change from a remote UI is performed on the password change screen 4500 illustrated in FIG. 7F. An old password is correctly entered, and a new password is entered considering that the password satisfies all items of the password policy. The password policy in the printer 300 is preliminarily formulated based on a security rule. In this example, the following items are defined. It is desirable that the password policy is appropriately updated based on factors such as security rule enhancement and security function enhancement of an information device.

The setting of the minimum number of characters of a password [eight characters]
The setting of prohibiting the use of three or more consecutive same characters [enabled]
The setting of including one or more uppercase alphabets [enabled]
The setting of including one or more lowercase alphabets [enabled]
The setting of including one or more numbers [disabled]
The setting of including one or more symbols [disabled]

In the present exemplary embodiment, the above-described items of the password policy are mere examples. In a known and usable password policy, many items other than the above-described items are included. The above-described items are not intended to limit the method of the present disclosure.

In accordance with the methods illustrated in the examples of the password policy settings in FIGS. 9A to 9H, an administrator presets the above-described password policy items using a local UI of the printer 300. By pressing setting buttons on the screens after setting the minimum number of characters and enabling or disabling settings using the setting screens in FIGS. 9B to 9H, setting data stored in the data memory 314 is updated via the setting DB module 1335.

In step S1001 of FIG. 10, in the smartphone 500, "aBcd1234" is entered into both of the new password entry field 4502 and the new password entry confirmation field 4503 on the password change screen 4500. In addition, the entry is determined by the setting button 4505 being pressed. In a case where a password is to be changed, first of all, to perform authentication to determine whether a correct password is entered in the old password entry field 4501, an entered character string is obfuscated and transmitted to the printer 300, and password authentication is performed by the PW management module 1345. In a case where the password authentication has succeeded, to execute a password change, the processing proceeds to step S1002. In a case where the password authentication has failed, a pop-up (not illustrated) indicating that a password is incorrect is presented, and the user is prompted to enter a correct password. In the present exemplary embodiment, by authenticating an old password prior to the password change, the execution of several processes on a new password character string that are to be performed even when password authentication has failed is prevented. Instead of the above-described method, a method of simultaneously performing the authentication of an old password and a change to a new password by transmitting the old password to the printer 300 together with the new password may be used. After that, the web browser 1534 performs a code check of an entered character type (not illustrated). In the present exemplary embodiment, the entry of an invalid character code is prevented by imposing entry restrictions after designating a pattern attribute of an input tag of a HyperText Markup Language (HTML) that constitutes an entry field.

Next, in step S1002, the smartphone 500 acquires various states such as the number of characters of the entered character string, and a used character type. In this step, in accordance with the above-described password policy including the six items, states regarding the number of used characters, whether each character type is used, and whether three or more consecutive same characters are used are acquired. The states of the password character string are acquired irrespective of the password policy setting stored in the printer 300, because a password policy setting managed by the setting DB module 1335 of the printer 300 is not referred to at this time point. The processing can also be executed by preliminarily transmitting a request for a password policy setting value to the printer 300, and performing password policy satisfaction determination with reference to a response to the request (i.e., password policy setting value), but the following disadvantage is generated.

First of all, a password policy setting value received as the above-described response is changed before being referred to on a remote UI side, and consistency is generated between the printer 300 and a remote UI. In this case, even in a case where a request for a password policy setting value is preliminarily transmitted to the printer 300 upon transition to the password change screen 4500, for example, a time lag in password policy setting update cannot be eliminated. In a case where a request for a password policy setting value is transmitted to the printer 300 upon the press of the setting button 4505 on the password change screen 4500, a time lag in password policy setting update is eliminated, but there is concern that respondence gets delayed depending on a network state. In addition to this, an increase in security risk that is attributed to the transmission of the set password policy to a communication path is also to be considered. Next, in a case where final password policy satisfaction determination is executed by the web browser 1534, unlike the case where final password policy satisfaction determination is executed on a local UI, a satisfaction determination result cannot be directly recognized on the printer 300, and it becomes difficult to acquire information such as statistical information to be collected based on the satisfaction determination result. In view of the foregoing, in the present exemplary embodiment, the final password policy satisfaction determination is executed on the printer 300, and on the remote UI side, password character string states are acquired irrespective of the password policy setting. In the present exemplary embodiment, the password character string states correspond to states of a password character string that correspond to setting items of the password policy.

The password character string states can be acquired by analyzing the entered password characters one character by one character. First of all, the number of password characters is acquired and stored into a region for storing the number of characters, among data regions for storing states. Subsequently, the processing proceeds to state analysis processing to be executed a number of times corresponding to the acquired number of password characters, and it is determined whether a target character is the same character as the previous character. In a case where a target character is the same character as the previous character, an initialized counter is incremented. In a case where a target character is not the same character as the previous character, the counter is initialized to 0. Upon a count value of the above-described counter being set to 2 during consecutive characters analysis corresponding to the number of characters, a password character string state regarding the use of three or more consecutive same characters is set to [used], and a flag indicating [used] is stored into a data region for storing the state of the target character string. On the other hand, in a case where a count value of the above-described counter does not reach 2 by the last character, a password character string state regarding the use of three or more consecutive same characters is set to [unused], and a flag indicating [unused] is set in the above-described data region.

In the determination as to whether one or more uppercase alphabets, one or more lower alphabets, one or more numbers, or one or more symbols are included, the determination is performed by determining whether a target character falls within a range of each character code, one character by one character. Through the above-described determination, a flag indicating whether each character type is used is stored into a data region for storing a use state of each target character type. In a case where a character code falls within the range of a target character code once, determination processing is skipped without determining subsequent characters. Password character string states acquired so far are stored into a region for storing the number of password characters, and flag storage regions for storing a use state of each character type and a use state of consecutive characters, among data storage regions of a JavaScript program operating on the web browser 1534.

Subsequently, in step S1003, the smartphone 500 obfuscates a password character string. In recent years, in a case where a password is transmitted to a communication path, encipherment or obfuscation has been conventionally performed, and has become widespread as a security countermeasure for leakage of important information such as a password. In the present exemplary embodiment, after obfuscation with lower security risk than encipherment is performed on a password, an update request is issued to the printer 300, and finally, password data stored in the data memory 314 is updated. Specifically, the obfuscation is executed by an obfuscation method of converting password data into fixed-length binary data to be obtained by executing a widely-known hash function such as the Secure Hash Algorithm (SHA)-2 or bcrypt a plurality of times. In the present exemplary embodiment, password data obfuscated by connecting a character string called salt, to a password character string, and calculating a hash value by applying a hash function of the SHA-512 in the SHA-2 to the entire character string a plurality of times is generated. In the present exemplary embodiment, a measure called stretching that prevents a hash value from being estimated by a brute-force attack, by applying the hash function to the entire character string 6500 times is also executed. An obfuscated password character string is generated by a Common Gateway Interface (CGI) program downloaded by the web browser 1534 from the web server module 1334 of the printer 300 or JavaScript operating as a library.

Next, in step S1004, the smartphone 500 returns the password character string state acquired in step S1002, and password data obfuscated in step S1003, to the printer 300. Specifically, by a program downloaded from a remote UI 1344 operating on the web browser 1534, the data is transmitted to the printer 300 as binary data mapped in a structure format in a POST request body of the HTTP. In the present exemplary embodiment, each piece of data is mapped in a structure format, but transmitted data may have another data format such as a comma separated value (CSV) format or a CSV format. Regarding the representation of obfuscated password data in FIG. 10, a password "aBcd1234" entered by the user is represented as 32-digit binary data. In a case where password character string states satisfy all items of the password policy, only obfuscated password data is transmitted without transmitting the password character string states. In this case, the number of password characters is the largest numerical value that can be entered, and is 30 in the present exemplary embodiment, and moreover, this state corresponds to a state in which password character string states indicated by the other flags satisfy all the items of the password policy.

Subsequently, processing on the printer 300 will be described. In step S1005, in the printer 300 that has received the password character string states and the obfuscated password data that have been transmitted from the smartphone 500 in step S1004 receives an event indicating event reception processing of the PW management module 1345, as a message. The message is a message delivered simultaneously with the remote UI 1344 being notified of data reception executed in compliance with the HTTP via the web server module 1334 arranged in the middleware layer 1330, from the network communication control module 1317 included in the system control layer 1310. The PW management module 1345 recognizes that the event is an administrator password change event, and it becomes possible to refer to the received password character string states and obfuscated password data based on a reference destination in the data memory 314 that is stored in a message parameter. Next, referring to the received password character string states, the printer 300 checks the existence or non-existence of data. The check is a check for transmission of only obfuscated password data in a case where the password character string states satisfy all the items. Specifically, in a case where data of a target password character string state does not exist (i.e., 0 is set in all reference items), the processing proceeds to step S1008 in which the received obfuscated password data is updated.

In a case where received data of the password character string states is present, the processing proceeds to step S1006, and to check the received data against a password policy setting, the PW management module 1345 issues a request for acquisition of setting values of the target password policy to the setting DB module 1335. Each setting value of the password policy that is to be returned from the setting DB module 1335 as a response to the request is stored in a temporary storage region held by the PW management module 1345. In the present exemplary embodiment, setting values of the password policy that are to be used to perform checkup are acquired at a time and stored into the temporary storage region. Aside from this, a corresponding setting value of the password policy may be acquired each time checkup is performed.

Next, in step S1007, the PW management module 1345 performs password policy satisfaction determination. Because the password policy satisfaction determination will be described in detail with reference to a flowchart in FIG. 11, assuming that policy violation is not detected, all set conditions are satisfied, and a determination result indicates a satisfied state, the processing proceeds to password update processing in step S1008.

In step S1008, in response to a result of the password policy satisfaction determination executed by the PW management module 1345 in step S1007, indicating "satisfied", a request for update of an administrator password is issued to the setting DB module 1335 and registration is performed. Aside from this, in a case where all items of the password policy are satisfied in step S1005, a password update request is issued to the setting DB module 1335 without executing the processing in steps S1006 and S1007.

In step S1009, based on identification information for storing a target administrator password, the setting DB module 1335 stores the obfuscated password data into a nonvolatile region of the data memory 314 in accordance with a data update procedure provided by the memory management module 1314. The PW management module 1345 that has completed password update advances the processing to step S1010, and notifies the web browser 1534 operating on the smartphone 500, of a processing result by returning a response of the HTTP. When all items of the password policy are satisfied and a password has been normally updated, 200 (OK) being a code indicating a normal end in a response of the HTTP is set in a response status, and returned. At this time, in the present exemplary embodiment, a status code that is to be use inside, and indicates that a password change has been completed is set in a response body part, and returned.

In step S1011, processing is executed by the smartphone 500. In step S1011, the web browser 1534 operating on the smartphone 500 that has received the password update completion response from the printer 300 displays the password change completion screen 4600 illustrated in FIG. 7G, and notifies the user of the password change completion.

Figure 11:
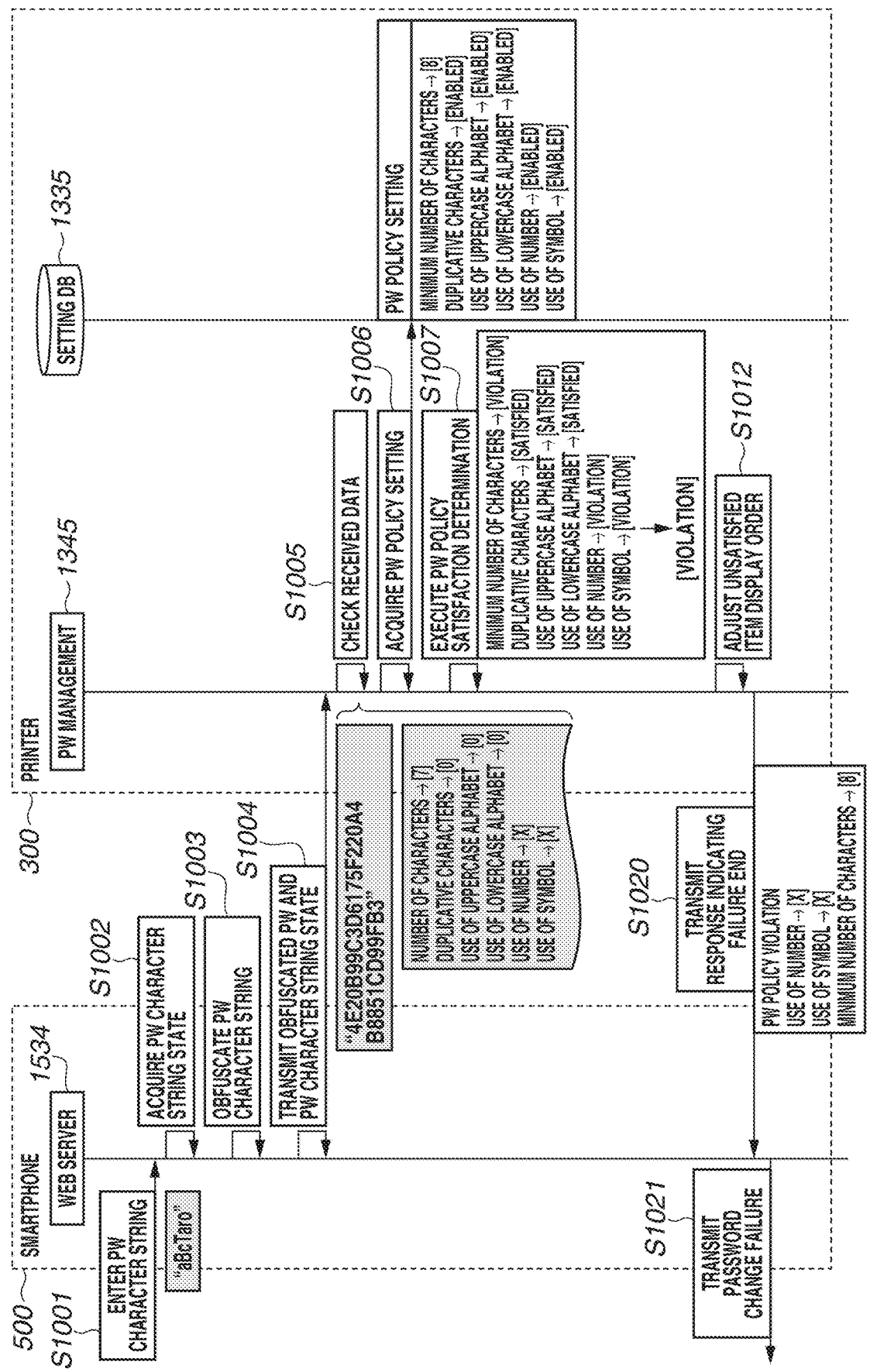
FIG. 11 is a sequence diagram illustrating another example of information communication to be executed with the smartphone at the time of password change according to the first exemplary embodiment.

FIG. 11 is a diagram illustrating another example of a sequence for executing a password change via a remote UI according to the present exemplary embodiment. The sequence in FIG. 11 differs from that in FIG. 10 in that the sequence is a sequence to be executed in a case where the password policy satisfaction determination is executed by the PW management module 1345 and a determination result indicates violation. Hereinafter, a difference from FIG. 10 will be mainly described.

In FIG. 11, a password character string entered in step S1001 is "aBcTaro". In addition, password policy setting values to be acquired from the setting DB module 1335 in step S1006 include the minimum number of characters set to 8, and other items all being set to "enabled".

In step S1007, in the password policy satisfaction determination executed by the PW management module 1345, a determination result indicates that three items corresponding to "the minimum number of characters of a password", "includes one or more numbers", and "includes one or more symbols" are unsatisfied. In a case where a result of the password policy satisfaction determination executed in step S1007 indicates [violation], in step S1012, display positions of the unsatisfied password policy items to be displayed to the user are adjusted. The display position adjustment processing will be described with reference to a flowchart illustrating password policy satisfaction violation display position adjustment processing in FIGS. 12A and 12B, which will be described below.

In step S1020, the PW management module 1345 that has determined that a password update has failed notifies the web browser 1534 operating on the smartphone 500, of a processing result by returning a PUT response of the HTTP. Specifically, when password update has failed due to three unsatisfied items of the password policy, 204 (NoContent) being a code indicating one of normal ends in a response of the HTTP is set in a response status and returned. At this time, in the present exemplary embodiment, a status code that is to be use inside, and indicates a failure in password change is set in a response body part, and furthermore, an ID for identifying an unsatisfied password policy is set as binary data and returned. In a case where a password policy is unsatisfied due to the minimum number of characters smaller than a defined setting value, to notify the user of the minimum number of characters, a value of the minimum number of characters is set in a predetermined position in a response body part as binary data. In the present exemplary embodiment, control is performed in such a manner that an identification ID of an unsatisfied password policy that has been set first is displayed at the top among items displayed on the web browser 1534, and an identification ID subsequently set is displayed next (i.e., at a lower position).

On the password change failure screen 4700 illustrated in FIG. 7H, number use violation, symbol use violation, and minimum number of characters violation are displayed in this order from the top, and password policy identification IDs are set in a similar order. In a case where there is a plurality of unsatisfied password policy items, the user often copes with the displayed password policy items from the top. By arranging an unsatisfied password policy item with a higher difficulty level of coping at the top, violation is expected to be corrected early. In a case where an item regarding the minimum number of password characters is unsatisfied, if the number of deficient characters is about one or two, a difficulty level of coping is not so high, but in a case where the number of deficient characters exceeds three, a difficulty level is expected to become higher due to the selection of a character type or word selection. Thus, in a case where a plurality of password policy items including the minimum number of password characters is unsatisfied, a countermeasure of adjusting a display position in accordance with the number of deficient characters is to be taken, and the description will be given with reference to FIGS. 12A and 12B.

In step S1021, the web browser 1534 operating on the smartphone 500 that has received a password update failure response from the printer 300 displays the password change failure screen 4700 illustrated in FIG. 7H, and notifies the user of a password change failure. On displays of the password change failure screen 4700, unsatisfied password policy items are displayed with being listed in descending order of a difficulty level of password policy satisfaction. By correcting the listed unsatisfied password policy items from the top, the user can avoid such a situation that it gradually becomes difficult to satisfy the password policy satisfaction. In addition, in a case where a password policy is unsatisfied due to the minimum number of characters smaller than a defined setting value, because the user is notified of a value of the minimum number of characters together, by presenting the minimum number of characters to the user, violation attributed to the minimum number of characters can be prevented from occurring thereafter.

Figure 12A:
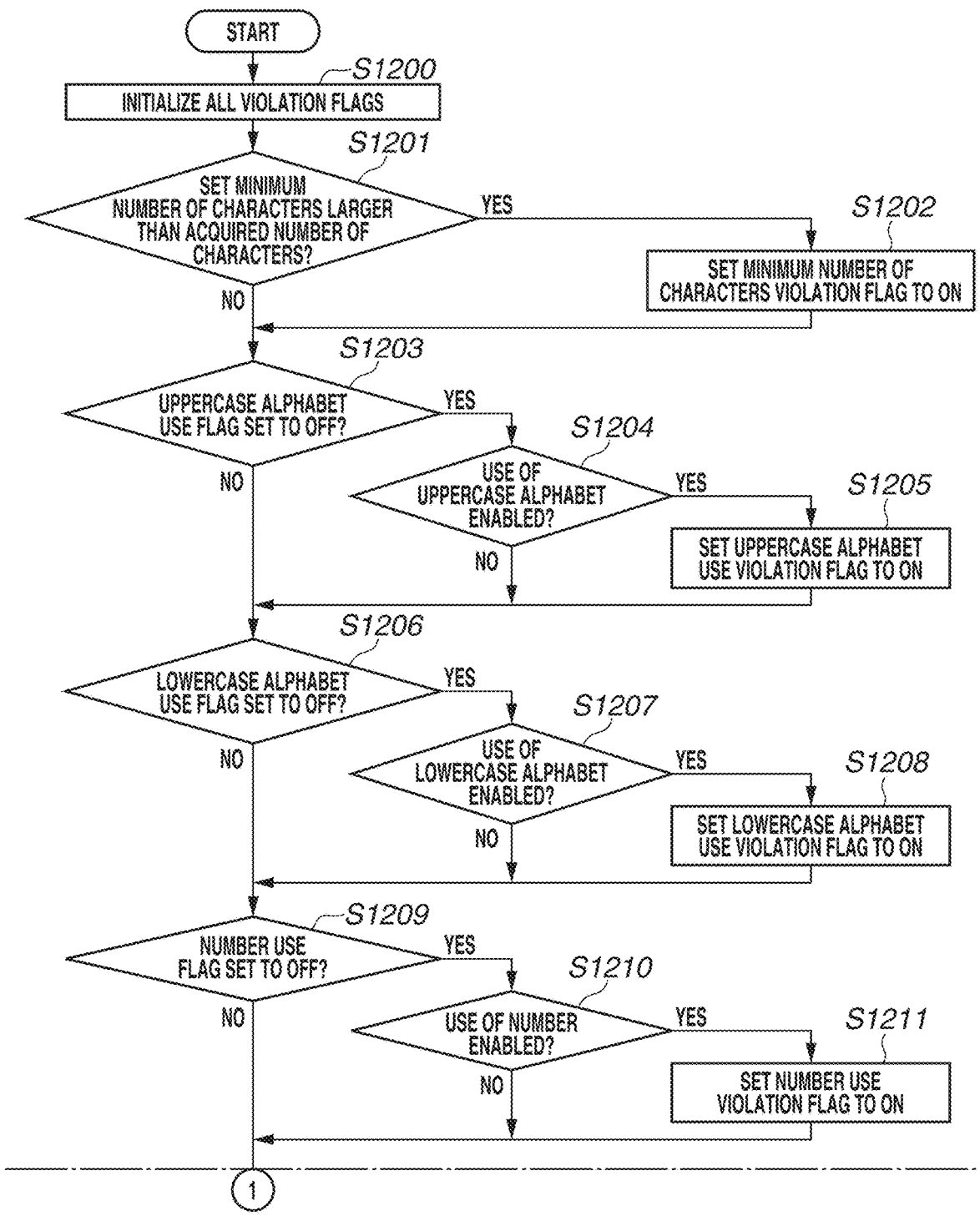
FIGS. 12A and 12B are a flowchart illustrating the details of password policy satisfaction determination processing to be executed by the printer according to the first exemplary embodiment.
Figure 12B:
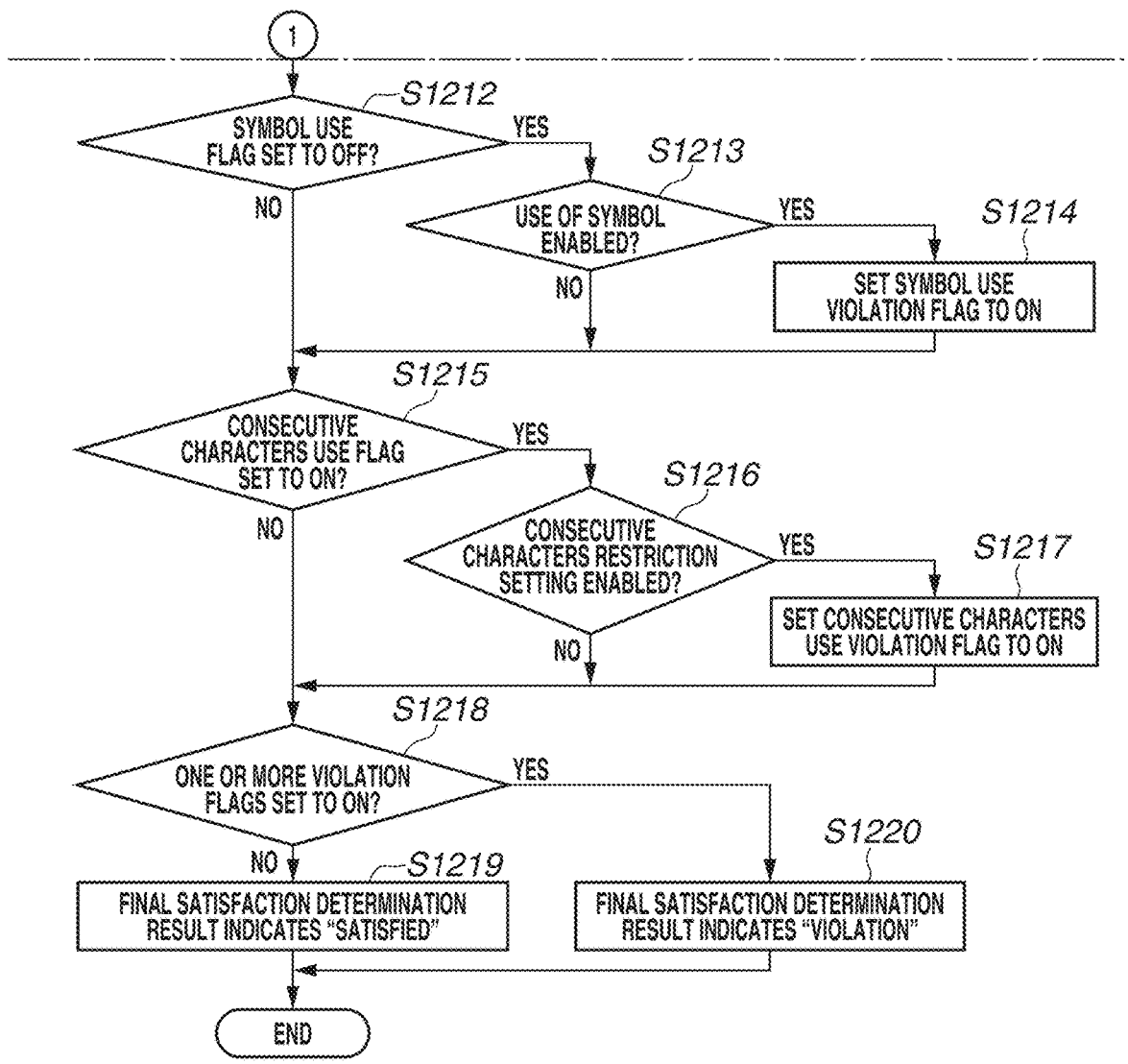

FIGS. 12A and 12B are a flowchart illustrating password policy satisfaction determination to be executed by the PW management module 1345 in step S1007 described above. The processing in this flowchart is started upon the password policy satisfaction determination in step S1007 of FIG. 10 being executed. To start the processing, the password character string states received from the smartphone 500 via a communication path in step S1005, and password policy setting values acquired from the setting DB module 1335 in step S1006 can be referred to.

First of all, in step S1200, the PW management module 1345 initializes a value of each violation flag to be subsequently used and referred to, to 0. In the present exemplary embodiment, a region for a violation flag including an array of binary values for each password policy item is ensured, and in a case where violation is to be indicated, 1 indicating ON is set, and if not, the set value remains to be a default value of 0.

In step S1201, the PW management module 1345 performs password policy satisfaction determination of the minimum number of characters. The number of acquired characters among the password character string states acquired in step S1005, and a setting value of the minimum number of characters among password policy setting values acquired from the setting DB module 1335 in step S1006 are compared. As a result of comparison, in a case where the setting value is larger (YES in step S1201), the processing proceeds to step S1202, in which the minimum number of characters violation flag is set to ON, and the processing proceeds to satisfaction determination of the next password policy item in step S1203. On the other hand, as a result of comparison, in a case where the setting value is equal to or smaller than the number of acquired characters (NO in step S1201), because this password policy item is satisfied, the processing proceeds to satisfaction determination of the next password policy item in step S1203 without performing a flag operation.

Next, in step S1203, the PW management module 1345 performs password policy satisfaction determination of uppercase alphabet use. In a case where a flag corresponding to uppercase alphabet use indicates [unused], among the password character string states acquired in step S1005 (YES in step S1203), the processing proceeds to step S1204. On the other hand, in a case where a flag corresponding to uppercase alphabet use indicates [used] (NO in step S1203), the processing proceeds to satisfaction determination of the next password policy item. In step S1204, it is determined whether a setting value of a password policy item requiring one or more uppercase alphabets to be included indicates "enabled", and in a case where the setting value indicates "enabled" (YES in step S1204), the processing proceeds to step S1205. In step S1205, an uppercase alphabet use violation flag is set to ON. In a case where the setting value indicates "disabled" (NO in step S1204), it is determined that this password policy item is satisfied even if a target flag indicates "unused" among the password character string states acquired in step S1005, and the processing proceeds to satisfaction determination of the next password policy in step S1206.

Next, in step S1206, the PW management module 1345 performs password policy satisfaction determination of lowercase alphabet use. In a case where a flag corresponding to lowercase alphabet use indicates [unused], among the password character string states acquired in step S1005 (YES in step S1206), the processing proceeds to step S1207. On the other hand, in a case where a flag corresponding to lowercase alphabet use indicates [used] (NO in step S1206), the processing proceeds to satisfaction determination of the next password policy item. In step S1207, it is determined whether a setting value of a password policy item requiring one or more lowercase alphabets to be included indicates "enabled", and in a case where the setting value indicates "enabled" (YES in step S1207), the processing proceeds to step S1208. In step S1208, a lowercase alphabet use violation flag is set to ON. In a case where the setting value indicates "disabled" (NO in step S1207), the processing proceeds to the next password policy satisfaction determination in step S1209.

Subsequently, in step S1209, the PW management module 1345 performs password policy satisfaction determination of number use. In a case where a flag corresponding to number use indicates [unused], among the password character string states acquired in step S1005 (YES in step S1209), the processing proceeds to step S1210. On the other hand, in a case where a flag corresponding to number use indicates [used] (NO in step S1209), the processing proceeds to satisfaction determination of the next password policy item. In step S1210, it is determined whether a setting value of a password policy item requiring one or more numbers to be included indicates "enabled", and in a case where the setting value indicates "enabled" (YES in step S1210), the processing proceeds to step S1211. In step S1211, a number use violation flag is set to ON. In a case where the setting value indicates "disabled" (NO in step S1210), the processing proceeds to the next password policy satisfaction determination in step S1212.

Subsequently, in step S1212, the PW management module 1345 performs password policy satisfaction determination of symbol use. In a case where a flag corresponding to symbol use indicates [unused], among the password character string states acquired in step S1005 (YES in step S1212), the processing proceeds to step S1213. On the other hand, in a case where a flag corresponding to symbol use indicates [used] (NO in step S1212), the processing proceeds to satisfaction determination of the next password policy item. In step S1213, it is determined whether a setting value of a password policy item requiring one or more symbols to be included indicates "enabled", and in a case where the setting value indicates "enabled" (YES in step S1213), the processing proceeds to step S1214. In step S1214, a symbol use violation flag is set to ON. In a case where the setting value indicates "disabled" (NO in step S1213), the processing proceeds to the next password policy satisfaction determination in step S1215.

Subsequently, in step S1215, the PW management module 1345 performs password policy satisfaction determination of consecutive characters use. In a case where a flag corresponding to consecutive characters use indicates [used], among the password character string states acquired in step S1005 (YES in step S1215), the processing proceeds to step S1216. On the other hand, in a case where a flag corresponding to consecutive characters use indicates [unused] (NO in step S1215), the processing proceeds to subsequent result determination. In step S1216, it is determined whether a setting value of a password policy item corresponding to consecutive characters use indicates "enabled", and in a case where the setting value indicates "enabled" (YES in step S1216), the processing proceeds to step S1217. In step S1217, a consecutive characters use violation flag is set to ON. In a case where the setting value indicates "disabled" (NO in step S1216), the processing proceeds to subsequent result determination in step S1218.

Finally, in step S1218, the PW management module 1345 scans the violation flags used in the above-described satisfaction determination of the password policy items, and determines whether ON is set in one or more flags. In a case where one or more violation flags are set to ON (YES in step S1218), the processing proceeds to step S1220. In step S1220, a result of the password policy satisfaction determination is set to [violation]. In a case where no violation flag is not set to ON (NO in step S1218), the processing proceeds to step S1219. In step S1219, a result of the password policy satisfaction determination is set to [satisfied]. The set result is to be used as a determination result in advancing subsequent operations of the PW management module 1345. In a case where the password policy satisfaction determination result indicates [satisfied], a request for password update is issued to the setting DB module 1335 in step S1008, and a response indicating a normal end is returned to the smartphone 500.

On the other hand, in a case where the password policy satisfaction determination result indicates [violation], a response indicating that the password update has failed is returned to the smartphone 500 together with item IDs of unsatisfied password policy items without updating the password.

Figure 13:
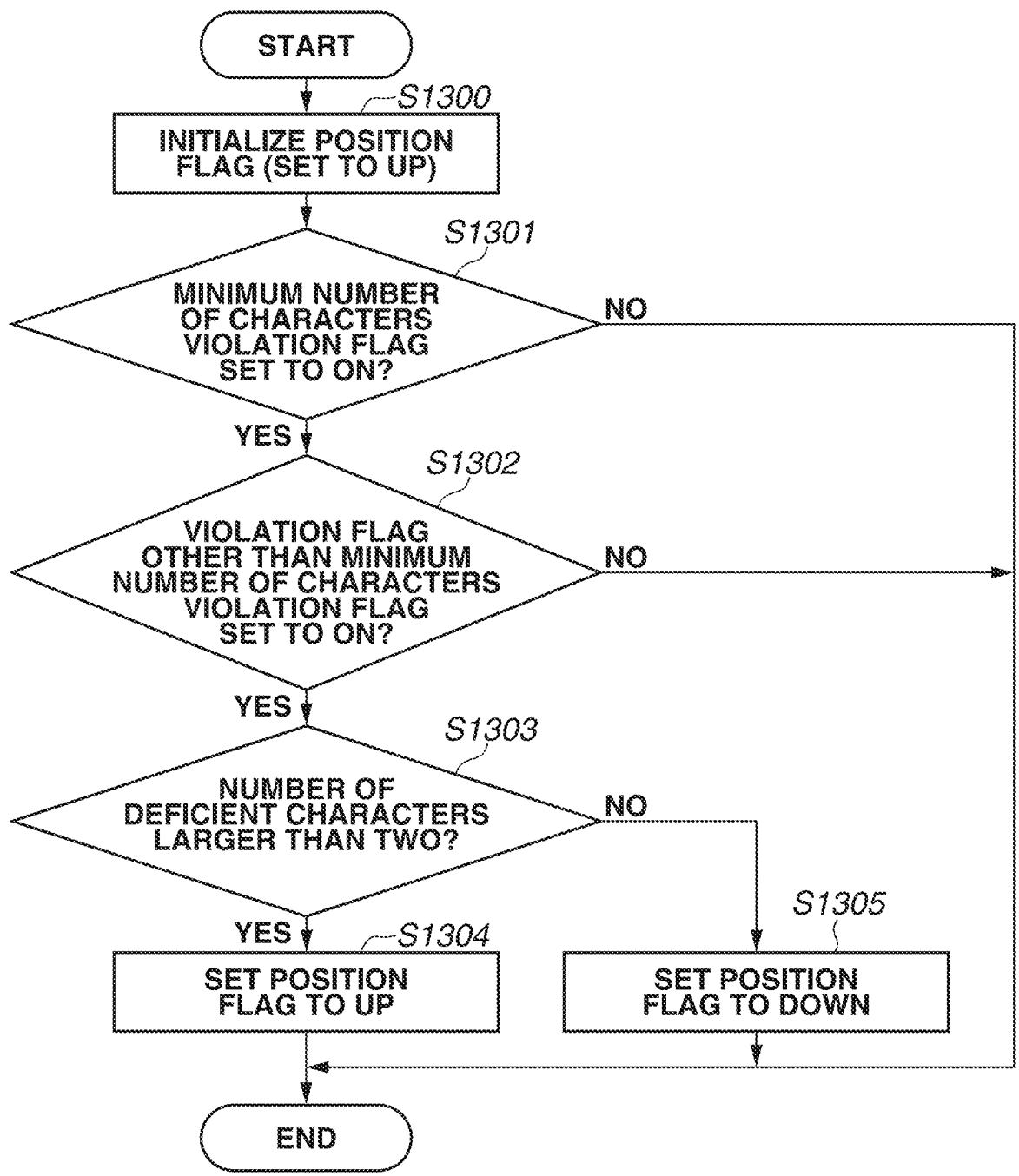
FIG. 13 is a flowchart illustrating the details of password policy satisfaction violation display position adjustment processing to be executed by the printer according to the first exemplary embodiment.

FIG. 13 is a flowchart illustrating processing to be executed as step S1012 in a case where a result of the password policy satisfaction determination executed in step S1007 described above indicates [violation], and executed to adjust a display position of an unsatisfied password policy item to be displayed to the user.

The processing in this flowchart is started upon the password policy satisfaction determination in step S1007 of FIG. 11 ending with a result indicating [violation].

First of all, in step S1300, the PW management module 1345 initializes a value of a position flag indicating a display position to be subsequently used and referred to, to 1 indicating "up". A table to be referred to defines values of the position flag in such a manner that 1 indicates "down". Next, the processing proceeds to step S1301, in which the PW management module 1345 determines whether a password policy item regarding the minimum number of characters is unsatisfied, with reference to the minimum number of characters violation flag set in step S1202 described above. In a case where a password policy item regarding the minimum number of characters is unsatisfied (YES in step S1301), the processing proceeds to step S1302. In a case where a password policy item regarding the minimum number of characters is satisfied (NO in step S1301), the processing ends.

In step S1302, the PW management module 1345 determines whether a violation flag other than the minimum number of characters violation flag is set to ON, among the violation flags used in the above-described password policy satisfaction determination processing in FIG. 11. In a case where a violation flag other than the minimum number of characters violation flag is set to ON (YES in step S1302), the processing proceeds to step S1303. In a case where a violation flag other than the minimum number of characters violation flag is not set to ON (NO in step S1302), the processing ends.

In step S1303, the PW management module 1345 calculates the number of deficient characters in the minimum number of characters violation, based on the number of acquired characters among the password character string states acquired in step S1005, and a setting value of the minimum number of characters. The PW management module 1345 determines whether a value obtained by subtracting the number of acquired characters from the setting value of the minimum number of characters (i.e., the number of deficient characters) is larger than two. In a case where the number of deficient characters is larger than two (YES in step S1303), the processing proceeds to step S1304.

In step S1304, the position flag is set to 0 indicating "up". In a case where the number of deficient characters is not larger than two (NO in step S1303), the processing proceeds to step S1305. In step S1305, the position flag is set to 1 indicating "down". In the processing in step S1020 of FIG. 11 that is to be executed thereafter, the PW management module 1345 refers to the above-described position flag when generating data to be transmitted to the smartphone 500, and fixes a display position of the unsatisfied password policy item regarding the minimum number of password characters. If the number of deficient characters of the minimum number of password characters is equal to or smaller than two, it is determined that a minor change is to be made to cope with the password policy violation, and the corresponding password policy item is displayed at a lower position. In a case where the number of deficient characters is not equal to or smaller than two, it is determined that a difficulty level of coping is high, the corresponding password policy item is displayed at a higher position.

As described above, according to the present exemplary embodiment, it is possible to construct a password policy including a remote UI environment, together with a local UI, and it becomes possible to safely change a password via a remote UI from an external apparatus on a communication path. Specifically, it becomes possible to further enhance a security level, by transmitting an obfuscated password difficult to be decoded, onto a communication path, and setting a password satisfying a password policy.

Other Exemplary Embodiments

Needless to say, the object of the present disclosure is achieved also by supplying a storage medium on which a program code of software implementing functions of the above-described exemplary embodiment is recorded, to a system or an apparatus, and a computer (or CPU or micro processing unit (MPU)) of the system or the apparatus reading and executing the program code stored in the storage medium. In this case, the program code read out from the storage medium itself implements functions of the above-described exemplary embodiment, and the storage medium storing the program code constitutes the present disclosure.

As the storage medium for supplying the program code, for example, a flexible disk, a hard disk, an optical disk, a magneto-optical disk, a compact disk read only memory (CD-ROM), a CD recordable (CD-R), a magnetic tape, a non-volatile memory card, an ROM, and a digital versatile disc (DVD) can be used.

Needless to say, a case where not only functions of the above-described exemplary embodiment are implemented by the computer executing the read program code, but also an OS operating on the computer performs part or all of actual processing based on an instruction of the program code, and the functions of the above-described exemplary embodiment are implemented by the processing is also included.

Furthermore, needless to say, a case where, after the program code read out from the storage medium is written into a memory included in a function expansion board added to the computer or a function expansion unit connected to the computer, a CPU included in the function expansion board or the function expansion unit performs part or all of actual processing based on an instruction of the program code, and the functions of the above-described exemplary embodiment are implemented by the processing is also included.

In the present disclosure, without departing from the scope of the disclosure, exemplary embodiments can be freely combined, an arbitrary component in each exemplary embodiment can be modified, or an arbitrary component in each exemplary embodiment can be omitted.

According to the present disclosure, it is possible to construct a structure for sharing with a local UI a password policy including a remote UI environment, and it becomes possible to construct a system protected by the password policy including a remote UI environment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-088408, filed May 30, 2023, which is hereby incorporated by reference herein in its entirety.

What is claimed is:

1. An information processing apparatus comprising:
at least one memory storing instructions; and
at least one processor that, upon execution of the stored instructions, is configured to operate as:
a first acquisition unit configured to acquire, from an external apparatus, a state regarding at least one item of a password policy of a password string entered on the external apparatus, and an obfuscated password string;
a second acquisition unit configured to acquire a setting, which is made in the information processing apparatus, regarding the at least one item of the password policy;

a determination unit configured to determine whether the obfuscated password string satisfies the password policy, based on the acquired state regarding the at least one item of the password policy of the password string, and the acquired setting regarding the at least one item of the password policy; and an update unit configured to update a password based on the obfuscated password string in a case where it is determined that the obfuscated password string satisfies the password policy.

2. The information processing apparatus according to claim 1, wherein execution of the stored instructions further configures the at least one processor to operate as: a notification unit configured to notify the external apparatus that the obfuscated password string does not satisfy the password policy when it is determined that the obfuscated password string does not satisfy the password policy.

3. The information processing apparatus according to claim 2, wherein the notification unit further notifies the external apparatus of an item of the password policy determined to be unsatisfied.

4. The information processing apparatus according to claim 3,
wherein the at least one item of the password policy includes the minimum number of characters, and
wherein, in a case where it is determined that the minimum number of characters is unsatisfied, the notification unit notifies the external apparatus of the set minimum number of characters.

5. The information processing apparatus according to claim 2,
wherein the at least one item of the password policy includes the minimum number of characters and a predetermined item different from the minimum number of characters, and
wherein the information processing apparatus further includes a processing unit configured to perform, in a case where it is determined that the minimum number of characters and the predetermined item are unsatisfied, processing for displaying, on the external apparatus, the minimum number of characters being unsatisfied at a higher position than the predetermined item being unsatisfied.

6. The information processing apparatus according to claim 5, wherein, in a case where the number of deficient characters of the minimum number of characters is larger than a predetermined number, the processing unit executes the processing for displaying.

7. The information processing apparatus according to claim 1, wherein execution of the stored instructions further configures the at least one processor to operate as: a storage unit configured to store, in a memory, the setting regarding the at least one item of the password policy.

8. The information processing apparatus according to claim 1, wherein the at least one item of the password policy includes any of an item of the minimum number of characters, an item indicating whether to prohibit use of consecutive same characters, an item indicating whether one or more uppercase alphabets are included, an item indicating whether one or more lowercase alphabets are included, an item indicating whether one or more numbers are included, and an item indicating whether one or more symbols are included.

9. The information processing apparatus according to claim 1, wherein, in a case where the entered password string satisfies all of the at least one item of the password policy, the obfuscated password is transmitted from the external apparatus, and the state regarding the at least one item of the password policy is not transmitted.

10. The information processing apparatus according to claim 1, wherein the information processing apparatus is a printer.

11. An information processing method comprising:
acquiring, in a first acquisition, from an external apparatus, a state regarding at least one item of a password policy of a password string entered on the external apparatus, and an obfuscated password string;
acquiring, in a second acquisition, a setting, which is made in the information processing apparatus, regarding the at least one item of the password policy;
determining whether the obfuscated password string satisfies the password policy, based on the acquired state regarding the at least one item of the password policy of the password string, and the acquired setting regarding the at least one item of the password policy; and
updating a password based on the obfuscated password string in a case where it is determined that the obfuscated password string satisfies the password policy.

12. An information processing system comprising:
an information processing apparatus; and
an external apparatus,
wherein the external apparatus includes
at least one memory storing instructions; and
at least one processor that, upon execution of the stored instructions, is configured to operate as:
a transmission unit configured to transmit, to the information processing apparatus, a state regarding at least one item of a password policy of a password string entered on the external apparatus, and an obfuscated password string, and
wherein the information processing apparatus includes:
at least one memory storing instructions; and
at least one processor that, upon execution of the stored instructions, is configured to operate as:
a first acquisition unit configured to acquire, from an external apparatus, a state regarding at least one item of a password policy of a password string entered on the external apparatus, and an obfuscated password string;
a second acquisition unit configured to acquire a setting, which is made in the information processing apparatus, regarding the at least one item of the password policy;
a determination unit configured to determine whether the obfuscated password string satisfies the password policy, based on the acquired state regarding the at least one item of the password policy of the password string, and the acquired setting regarding the at least one item of the password policy; and
an update unit configured to update a password based on the obfuscated password string in a case where it is determined that the obfuscated password string satisfies the password policy.

\* \* \* \* \*